United States Patent
Ishigami et al.

(10) Patent No.: US 8,705,846 B2
(45) Date of Patent: Apr. 22, 2014

(54) POSITION MEASURING APPARATUS, POSITION MEASURING METHOD, IMAGE PROCESSING APPARATUS AND IMAGE PROCESSING METHOD

(75) Inventors: Tomohide Ishigami, Osaka (JP); Akio Nishimura, Osaka (JP); Tetsuro Okuyama, Osaka (JP)

(73) Assignee: Panasonic Corporation, Osaka (JP)

( * ) Notice: Subject to any disclaimer, the term of this patent is extended or adjusted under 35 U.S.C. 154(b) by 251 days.

(21) Appl. No.: 13/213,303

(22) Filed: Aug. 19, 2011

(65) Prior Publication Data

US 2012/0045100 A1    Feb. 23, 2012

(30) Foreign Application Priority Data

Aug. 20, 2010   (JP) ................................ 2010-184599

(51) Int. Cl.
*G06T 15/06*   (2011.01)

(52) U.S. Cl.
USPC .......................................................... 382/154

(58) Field of Classification Search
None
See application file for complete search history.

(56) References Cited

PUBLICATIONS

Koyasu et al., "Recognizing Moving Obstacles for Robot Navigation using Real-time Omnidirectional Stereo Vision", Journal of Robotics and Mechatronics, vol. 14, No. 2, 2002, pp. 1-9.*

Micusik et al., "Omnidirectional Camera Model and Epipolar Geometry Estimation by RANSAC with bucketing", 13th Scandinavian Conference, SCIA 2003 Halmstad, Sweden, Jun. 29-Jul. 2, 2003, Copyright 2003, 11 pages.*

Southwell et al., Panoramic Stereo, IEEE, Proceedings of ICPR'96, 1996, pp. 378-382.*

Yuichiro Kojima et al., "*Narrow Baseline Omnidirectional Stereo using Disparity Detection Filter*", Meeting on Image Recognition and Understanding (MIRU2007), Jul. 2007 with English translation.

* cited by examiner

*Primary Examiner* — Brian P Werner
(74) *Attorney, Agent, or Firm* — Wenderoth, Lind & Ponack, L.L.P.

(57) ABSTRACT

A position measuring apparatus which measures a position of a position measurement target easily and accurately without using any parameter inside a camera in the measurement, based on images captured from mutually different viewpoints. The position measuring apparatus which measures the three-dimensional position of the position measurement target, based on the input images captured from the mutually different viewpoints, and the position measuring apparatus includes: a ray information storage unit configured to store ray information in which each of ray vectors is associated with a corresponding one of pixels in one of the input images, each of the ray vectors indicating a forward direction of a light incident onto an optical system for a corresponding one of the input images; and a position measuring unit configured to measure the three-dimensional position of the position measurement target, using the ray information stored in the ray information storage unit.

21 Claims, 15 Drawing Sheets

POSITION MEASURING APPARATUS, POSITION MEASURING METHOD, IMAGE PROCESSING APPARATUS AND IMAGE PROCESSING METHOD

BACKGROUND OF THE INVENTION (1) Field of the Invention

The present invention relates to a position measuring apparatus and a position measuring method for measuring a position of a position measurement target, based on a plurality of images captured from mutually different viewpoints.

(2) Description of the Related Art

A monitoring camera which captures images of a suspicious person, package, vehicle, or the like, and/or a navigation system of a moving or mobile robot require(s) detailed three-dimensional position information of objects present in a range of 360 degrees.

As a typical means for obtaining three-dimensional coordinates, stereoscopic viewing is known which involves detecting corresponding points between images captured by cameras arranged at mutually different viewpoints such that ranges for capturing images are overlapped with each other, and calculating three-dimensional distances between the cameras and the objects based on the amounts of disparity (parallax) between each of pairs of corresponding points.

In addition, recent years have seen emergence of cameras configured to increase a camera's view field to 360 degrees. Examples of such cameras include fisheye cameras using a fisheye lens having a wide imaging angle, and small omnidirectional cameras each composed of (i) a compound mirror which is a combination of a paraboloid and a hyperbolic mirror and (ii) a camera.

Such an omnidirectional stereo camera captures images in a polar coordinate system. Thus, it is impossible to detect corresponding points using a typical stereoscopic viewing technique for handling images captured in an orthogonal coordinate system.

A technique for measuring positions using a small omnidirectional camera is disclosed in Non-patent Literature (NPL) 1 (Ryusuke Sagawa, Yuichiro Kojima, Yasushi Yagi, "Narrow Baseline Omnidirectional Stereo using Disparity Detection Filter", Meeting on Image Recognition and Understanding (MIRU, 2007), pp. IS-3-31 (2007)). First, an epipolar plane and an epipolar line are calculated using parameters (the curvature of a paraboloidal mirror, the position of an apex, a focal point, etc.) stored inside the camera. Subsequently, corresponding points are calculated by introducing a parallax detection filter to synthesize the parallax of the images smoothed along the epipolar line using windows having various sizes, and positions on omnidirectional images are measured based on the amounts of the parallax.

SUMMARY OF THE INVENTION

However, the technique of NPL 1 requires that parameters stored inside the camera are exactly calculated by calibration in order to enable calculation of an epipolar line. The technique of NPL 1 further requires that complex optical calculations are performed using the camera parameters.

For this reason, in the case where an acrylic hemispherical dome for dust and water prevention is attached to a small omnidirectional camera, it is impossible to exactly calculate the refractive index in each of points in the dome, and thus to obtain accurate corresponding points by performing optical calculations. This produces a problem that large errors are included in the position measurement results.

The present invention has been conceived to solve the aforementioned conventional problem with an aim to provide a position measuring apparatus and a position measuring method for measuring a position of a position measurement target with ease and a high precision without using any parameters stored inside a camera when measuring the position of the position measurement target, based on a plurality of images captured from mutually different viewpoints.

In order to achieve the aforementioned aim, a position measuring apparatus according to an aspect of the present invention is a position measuring apparatus which measures a three-dimensional position of a position measurement target, based on a plurality of input images captured from mutually different viewpoints, the position measuring apparatus including: a ray information storage unit configured to store ray information in which each of ray vectors is associated with a corresponding one of pixels in one of the plurality of input images, each of the ray vectors indicating a forward direction of a light incident onto an optical system for a corresponding one of the input images; and a position measuring unit configured to measure the three-dimensional position of the position measurement target, using the ray information stored in the ray information storage unit.

With this structure, it is possible to measure the three-dimensional position of the position measurement target, using ray information which associates each of ray vectors indicating the forward direction of light incident onto the optical system for each of input images with a corresponding one of the pixels in the input image. Accordingly, it is possible to measure the position of the position measurement target with ease and a high precision without using the parameters stored inside the camera.

Furthermore, an image processing apparatus according to another aspect of the present invention is an image processing apparatus which corrects distortion in each of input images, the image processing apparatus including: a ray information storage unit configured to store ray information in which each of ray vectors is associated with a corresponding one of pixels in one of the plurality of input images, each of the ray vectors indicating a forward direction of a light incident onto an optical system for a corresponding one of the input images; and a distortion-corrected image generating unit configured to correct distortion in each of the input images, using the ray information stored in the ray information storage unit.

With this structure, it is possible to correct distortion in the input images, using ray information in which each of the ray vectors indicating the forward direction of light incident onto the optical system for each of input images with is associated with the corresponding one of the pixels in the input image. Accordingly, it is possible to correct the distortion in the input images with ease and a high precision without using the parameters stored inside the camera.

Furthermore, the present invention can be implemented not only as a position measuring apparatus or an image processing apparatus including the above described unique processing units, but also can be realized as a position measuring method or an image processing method including the steps corresponding to the unique processing units of the position measuring apparatus or the image processing apparatus. Furthermore, the present invention can be realized as a computer program causing a computer to execute the respective unique steps of the position measuring method or the image processing method. As a matter of course, such a computer program can be distributed via computer-readable recording media such as CD-ROMs or communication networks such as the Internet.

According to the present invention, it is possible to measure the position of a position measurement target with ease and a high precision without using any parameters inside a camera when measuring the position of the position measurement target, based on a plurality of images captured from mutually different viewpoints.

Further Information About Technical Background To this Application

The disclosure of Japanese Patent Application No. 2010-184599 filed on Aug. 20, 2010 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DETAILED DESCRIPTION OF THE INVENTION

Embodiments of the present invention will be described with reference to the drawings. The embodiments described below are preferred specific examples of the present invention. In other words, the numerical values, shapes, materials, structural elements, the arrangement and connection of the structural elements, steps, the processing order of the steps etc. shown in the following embodiments are mere examples, and therefore do not limit the present invention. The present invention is defined by the features and limitations of the claims. Therefore, among the structural elements in the following embodiments, the structural elements not recited in any one of the independent claims defining the most generic concept of the present invention are not necessarily required to achieve the aim of the present invention. Each of such optional structural elements is described as structural elements of (a) corresponding one(s) of preferred embodiments.

(Embodiment 1)

Figure 1:
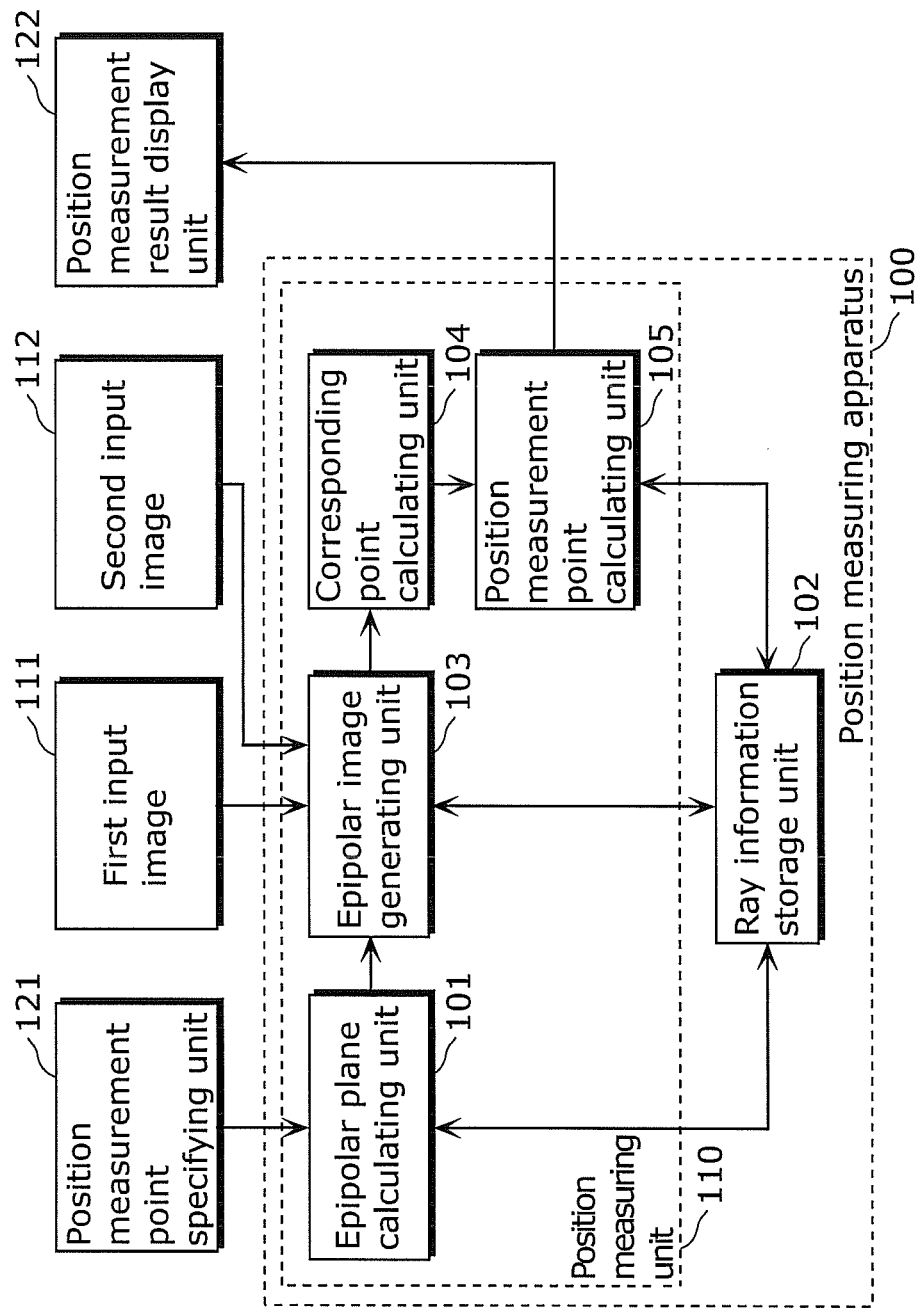
FIG. 1 is a block diagram showing a structure of a position measuring apparatus according to Embodiment 1 of the present invention.

FIG. 1 is a block diagram showing a structure of a position measuring system according to Embodiment 1 of the present invention.

In FIG. 1, the position measuring system includes a position measuring apparatus 100, a position measurement point specifying unit 121, and a position measurement result display unit 122.

The position measurement point specifying unit 121 specifies image coordinates of a point (position measurement point) at which a position measurement target is positioned. The point is in one of images among a first input image 111 and a second input image 112 captured from mutually different viewpoints such that the position measurement target is included in the images. Next, the position measurement point specifying unit 121 transmits the image coordinates of the position measurement point to an epipolar plane calculating unit 101 included in the position measuring apparatus 100.

The position measurement result display unit 122 displays, on the image screen, information indicating the three-dimensional position of the position measurement target measured by the position measuring apparatus 100.

The position measuring apparatus 100 estimates the three-dimensional position of the position measurement target based on a plurality of input images (here, the input images are the first input image 111 and the second input image 112) captured from mutually different viewpoints. As shown in FIG. 1, the position measuring apparatus 100 includes a position measuring unit 110 and a ray information storage unit 102.

The position measuring unit 110 measures the three-dimensional position of the position measurement target, using the ray information stored in the ray information storage unit 102. More specifically, the position measuring unit 110 includes an epipolar plane calculating unit 101, an epipolar image generating unit 103, a corresponding point calculating unit 104, and a position measurement point calculating unit 105.

The epipolar plane calculating unit 101 calculates, using the ray information, an epipolar plane that is defined by the position of a first optical system corresponding to a first input image 111, the position of a second optical system corresponding to a second input image 112, and the position of the position measurement target. More specifically, the epipolar plane calculating unit 101 calculates the epipolar plane, based on the image coordinates of the position measurement point specified by the position measurement point specifying unit 121 and the ray information stored in the ray information storage unit 102. Next, the epipolar plane calculating unit 101 transmits information indicating the epipolar plane to the epipolar image generating unit 103.

The epipolar image generating unit 103 generates a first epipolar image corresponding to the first input image, and a second epipolar image corresponding to the second input image, based on a normal vector on the epipolar plane and each of an epipolar line vector in the first input image 111 and an epipolar line vector in the second input image 112. More specifically, the epipolar image generating unit 103 generates an epipolar image, based on the image coordinates of the position measurement point specified by the position measurement point specifying unit 121, the information indicating the epipolar plane, the first input image 111 and the second input image 112, and the ray information stored in the ray information storage unit 102. Next, the epipolar image generating unit 103 transmits the epipolar image to the corresponding point calculating unit 104.

The corresponding point calculating unit 104 calculates, based on the epipolar image generated by the epipolar image generating unit 103, the image coordinates of the corresponding point that corresponds to the position measurement point specified by the position measurement point specifying unit 121 and on the image captured from a viewpoint different from the viewpoint of the image including the position measurement point. More specifically, here, the corresponding point calculating unit 104 calculates a corresponding point that is a corresponding pixel in the second epipolar image with a pixel including the position measurement target in the first epipolar image. Next, the corresponding point calculating unit 104 transmits the image coordinates of the corresponding point to the position measurement point calculating unit 105.

The position measurement point calculating unit 105 calculates the three-dimensional position of the position measurement target, based on the image coordinates of the position measurement point specified by the position measurement point specifying unit 121, the image coordinates of the corresponding point calculated by the corresponding point calculating unit 104, and each of the ray vectors each stored in the ray information storage unit 102 and associated with the image coordinates of a corresponding one of the position measurement point and the corresponding point. In other words, the position measurement point calculating unit 105 calculates, as the three-dimensional position of the position measurement target, the three-dimensional position that is the intersection of the ray vector for the position measurement point and the ray vector for the corresponding point. Next, the position measurement point calculating unit 105 transmits the coordinates indicating the calculated three-dimensional position to the position measurement result display unit 122.

Next, an example of the imaging apparatus for obtaining the first input image and the second input image captured from mutually different viewpoints is briefly described with reference to FIG. 2.

Figure 2:
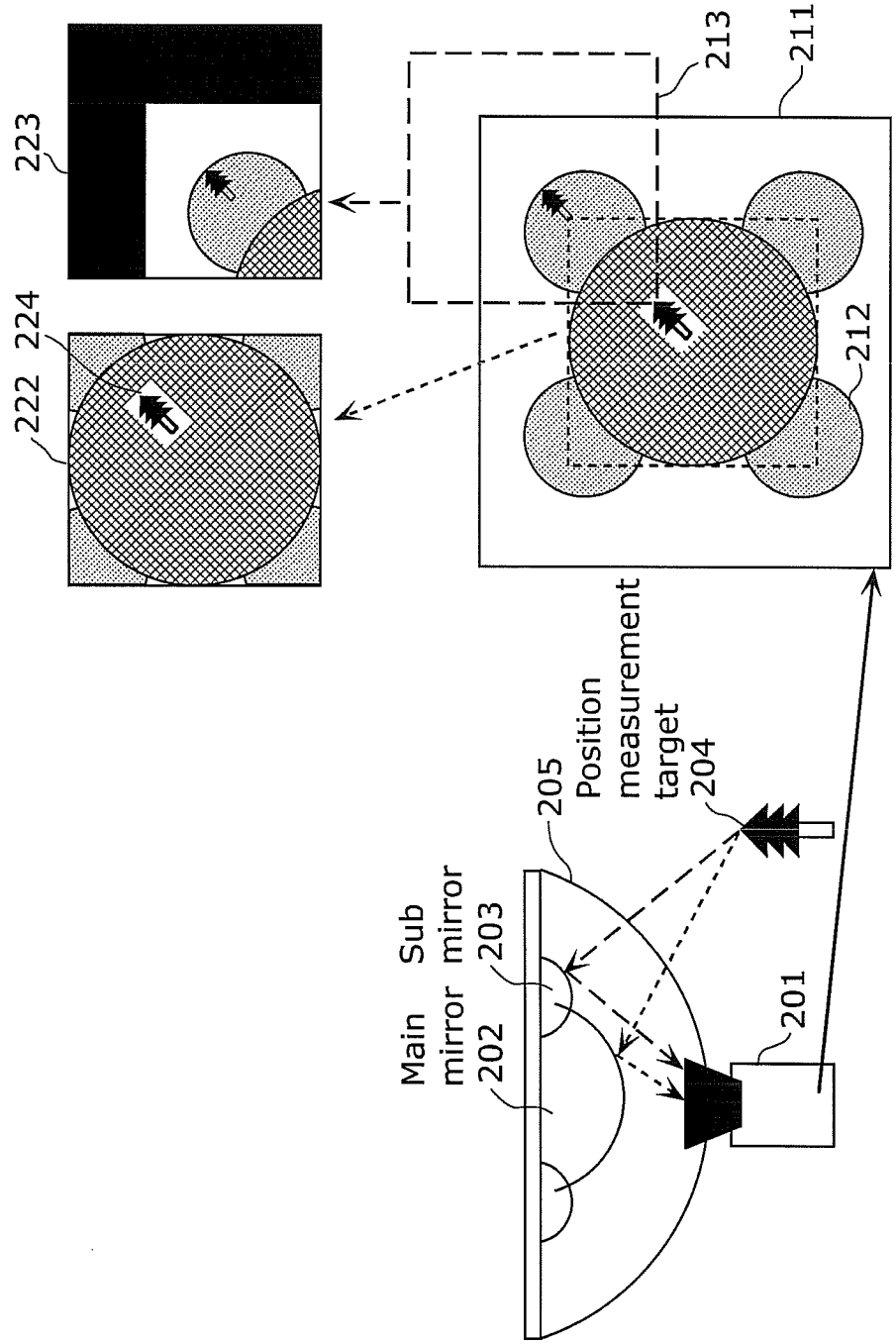
FIG. 2 is an illustration of an example of an imaging apparatus according to Embodiment 1 of the present invention.

FIG. 2 is an illustration of an example of an imaging apparatus according to Embodiment 1 of the present invention. In FIG. 2, the imaging apparatus includes a camera 201, a main mirror 202 which is a paraboloidal mirror, four sub mirrors (including a sub mirror 203) each of which is a paraboloidal mirror, and an acrylic dome 205 for dust and water prevention.

In this embodiment, a first optical system is composed of a camera 201, a main mirror 202, and a dome 205. In addition, a second optical system is composed of a camera 201, a sub mirror 203, and a dome 205.

In addition, a captured image 211 is an image captured by the camera 201, and includes an omnidirectional image formed by light reflected from the main mirror 202 and the sub mirror 203.

A main mirror image 222 is an extracted image of an image area 212 in which the main mirror 202 is included in the captured image 211, and corresponds to the first input image 111 in FIG. 1. A sub mirror image 223 is an extracted image of an image area 213 in which the main mirror 203 is included in the captured image 211, and corresponds to the second input image 112 in FIG. 1. Each of the main mirror image 222 and the sub mirror image 223 includes an image of the position measurement target 204.

Each of the main mirror image 222 and the sub mirror image 223 is generated, for example, from the captured image 211 using a program for image processing or the like in a computer connected to the camera. In addition, this embodiment describes a case of specifying, as a position measurement point 224, an image point including an image of the position measurement target 204 in the main mirror image 222.

It is to be noted that the imaging apparatus shown in FIG. 2 is an example of an imaging apparatus for obtaining the first input image 111 and the second input image 112, and thus the imaging apparatus for use here does not necessarily have the above structure. For example, the imaging apparatus may be configured to include, side-by-side, two omnidirectional sensors including a hyperbolic mirror and a camera. In addition, the imaging apparatus may be configured to include, side-by-side, two fisheye cameras. In other words, the imaging apparatus may have any other structure that enables capturing of a plurality of images from mutually different viewpoints.

Next, a description is given of ray information stored in the ray information storage unit 102.

Figure 3:
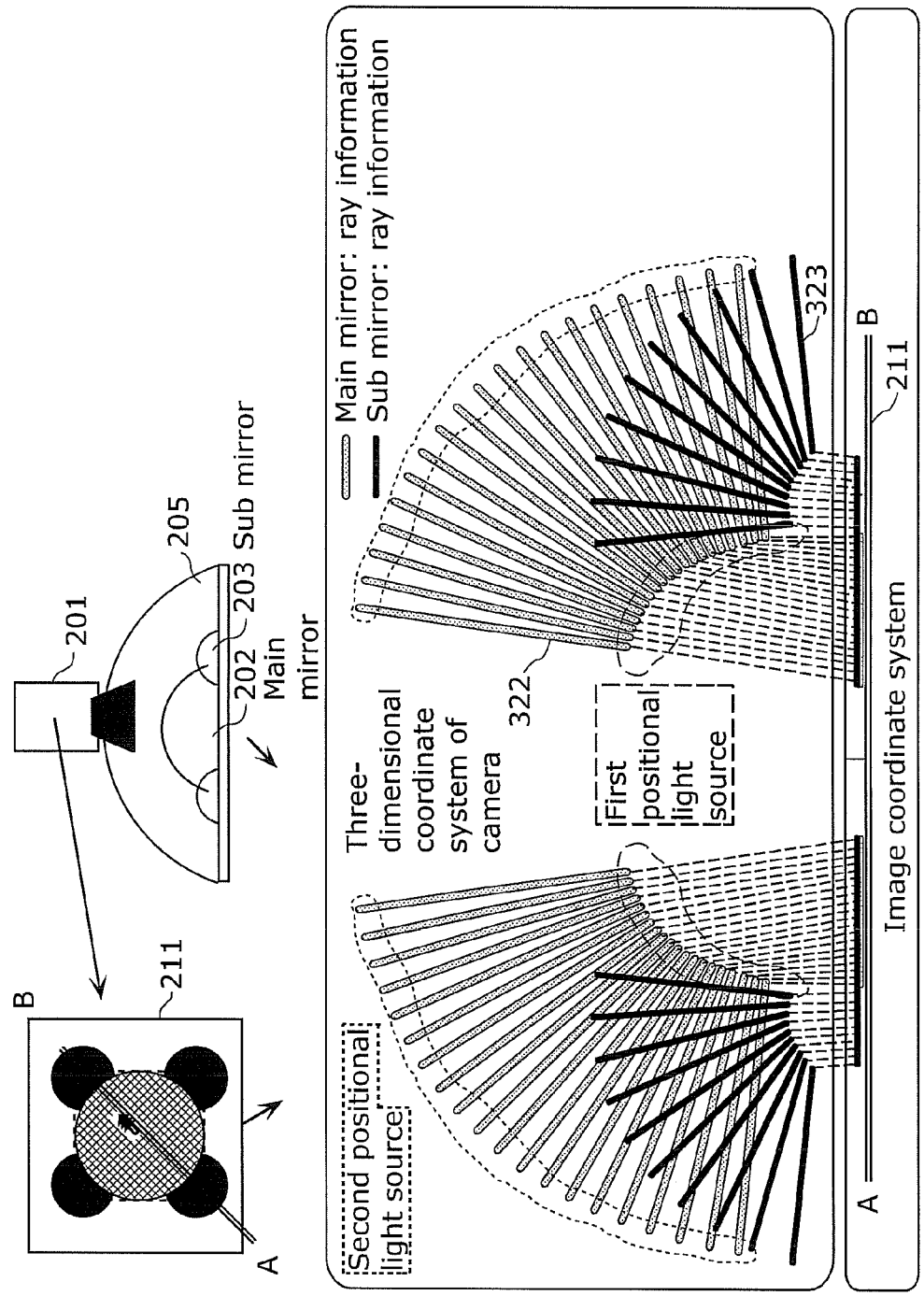
FIG. 3 is an illustration of an example of ray information according to Embodiment 1 of the present invention.

FIG. 3 is an illustration of an example of ray information according to Embodiment 1 of the present invention.

The ray information is information in which each of forward directions of light incident from outside onto the optical system is associated with a corresponding one of pixels in the image 211 captured by the camera 201. The ray information is, for example, a pixel unit table 401 in FIG. 4. The ray information indicates pixel numbers each of which identifies a pixel in the main mirror image 222 or in the sub mirror image 223, and the position (X, Y, Z) and direction (X, Y, Z) of the forward direction of the light corresponding to the pixel.

Here, the forward direction of the light is also referred to as a ray vector. In addition, the position is also referred to as a position vector. In addition, the direction is also referred to as a direction vector. The ray vector is composed of a position vector and a direction vector, and has a relationship with a corresponding one of the pixels separately included in the main mirror image 222 and the sub mirror image 223.

Next, a description is given of an example of a method of generating ray information.

Figure 5:
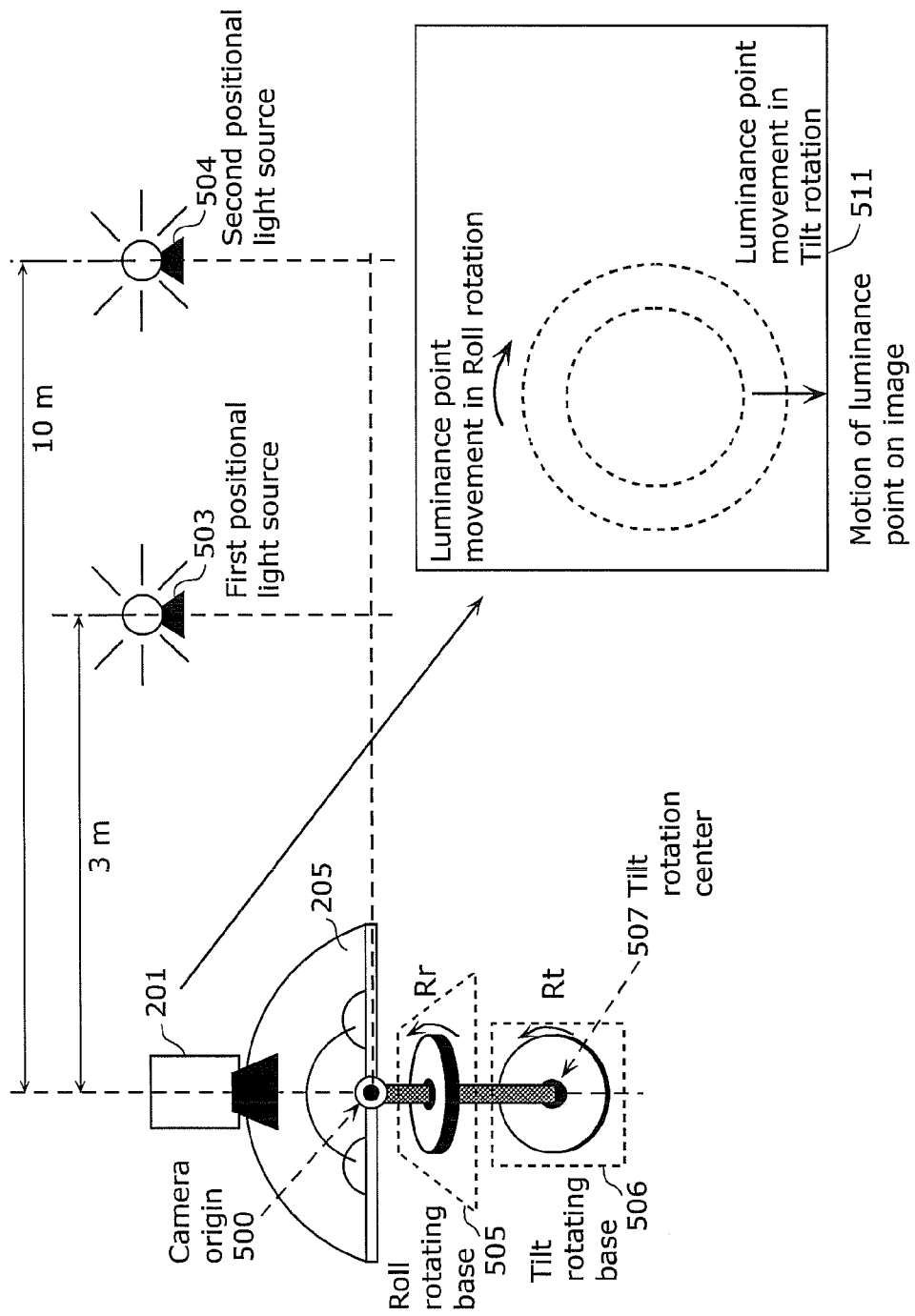
FIG. 5 is an illustration of an example of a method of generating ray information according to Embodiment 1 of the present invention.

FIG. 5 is an illustration of an example of a method of generating ray information according to Embodiment 1 of the present invention.

As shown in FIG. 5, a first positional light source 503 is disposed apart by 3 m from a camera origin 500 of the imaging apparatus. In addition, a second positional light source 504 is disposed apart by 10 m from the camera origin 500. A ray vector indicating the forward direction of light is calculated based on the image including captured images of the first positional light source 503 and the second positional light source 504.

The camera origin 500 is an intersection of the optical axis of the camera 501 and the ceiling of the dome 502. This camera origin 500 corresponds to a reference point used in common in a plurality of optical systems corresponding to a plurality of input images.

This embodiment changes the posture of the imaging apparatus instead of changing the position of the first positional light source 503 and the second positional light source 504, when capturing images for generating ray information. The following describes a structure for changing the posture of the imaging apparatus.

A Roll rotating base 505 is disposed such that its rotation axis matches the optical axis of the camera 201, and rotates the imaging apparatus in the Roll direction. A Tilt rotating base 506 is disposed such that its rotation axis is orthogonal to the optical axis of the camera 501 (that is, the rotation axis of the Roll rotating base 505), and rotates the Roll rotating base 505 in the Tilt direction. The Roll rotating base 505 and the Tilt rotating base 506 can be implemented using a rotating stage or the like in which a stepping motor, a servo motor, or the like is installed.

Hereinafter, the rotation axis of the Roll rotating base 505 is referred to as a Roll rotation axis, and the rotation axis of the Tilt rotating base 506 is referred to as a Tilt rotation axis.

A captured image 511 is an image which is captured with rotations of the Roll rotating base 505 and the Tilt rotating base 506. When the Roll rotating base 505 is rotated, images of the first positional light source 503 and the second positional light source 504 move circularly about the Roll rotation axis on the captured image 511. In addition, when the Tilt rotating base 506 is rotated, images of the first positional light source 503 and the second positional light source 504 change in their distances from the Roll rotation axis (that is, the radiuses of the circles in the Roll rotations).

Accordingly, controlling the rotations of the Roll rotating base 505 and the Tilt rotating base 506 makes it possible to move the images of the first positional light source 503 and the second positional light source 504 to arbitrary areas on the captured image 511.

Figure 6:
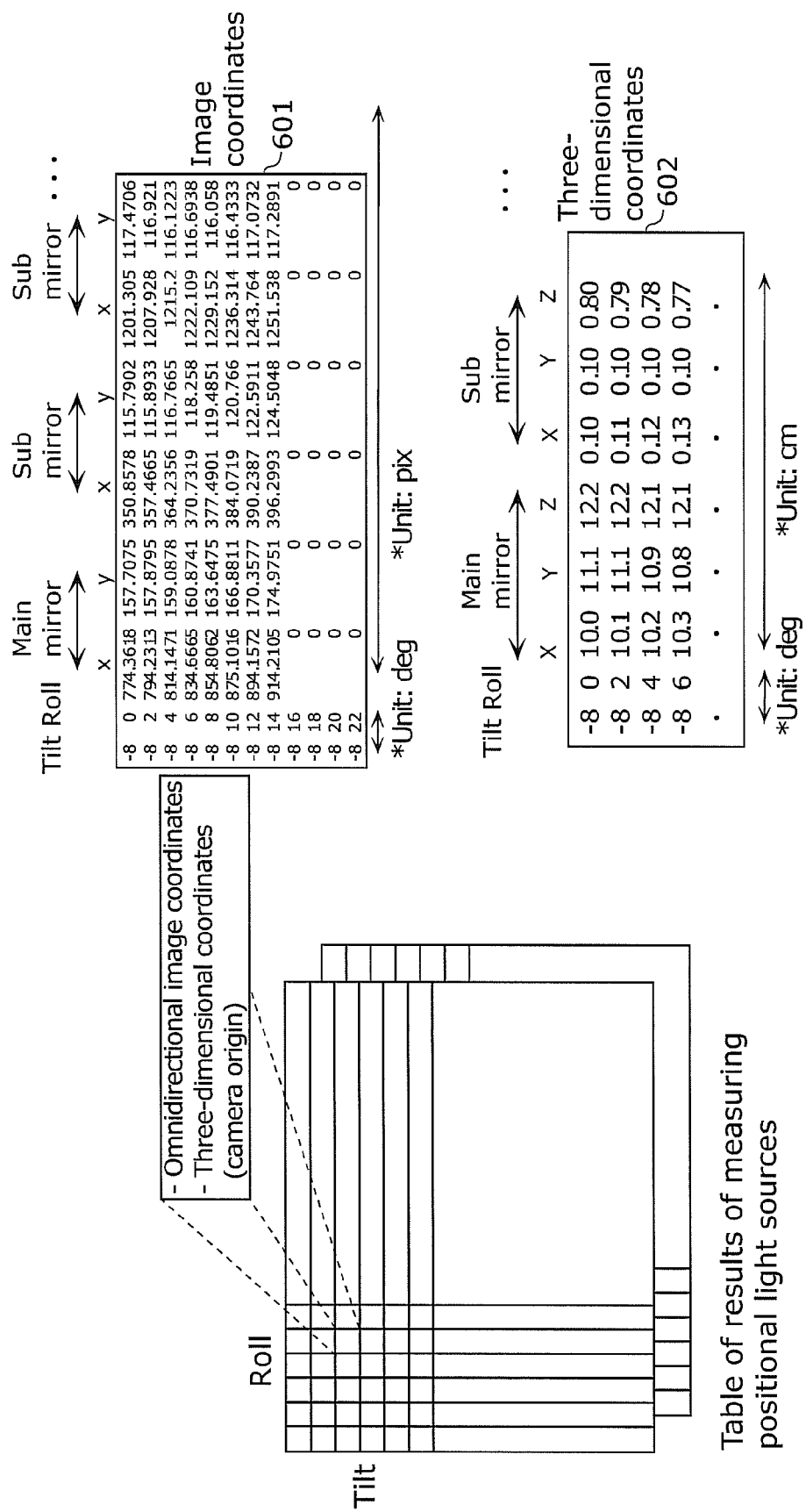
FIG. 6 is a diagram showing an example of a table of results of measuring positional light sources according to Embodiment 1 of the present invention.

FIG. 6 is a diagram showing an example of a table of results of measuring positional light sources according to Embodiment 1 of the present invention.

FIG. 6 is an illustration of position measurement results of positional light sources according to Embodiment 1 of the present invention. The table of results of measuring positional light sources 601 stores image coordinates of images of the first positional light source 503 and the second positional light source 504 in association with the Roll and Tilt rotation angles. The table of results of measuring positional light sources 601 stores image coordinates of each of a main mirror image and a sub mirror image.

In addition, the image coordinates of the first positional light source 503 and the second positional light source 504 are calculated by detecting the high luminance areas in the main mirror image and the sub mirror images. In this case, it is desirable that the imaging apparatus capture images of the first positional light source 503 and the second positional light source 504 in a dark room. In this way, it is possible to easily detect images of the first positional light source 503 and the second positional light source 504 using general image processing such as luminance threshold processing.

A table of results of measuring positional light sources 602 stores world coordinates (three-dimensional coordinates) of images of the first positional light source 503 and the second positional light source 504 in association with the Roll and Tilt rotation angles. The table of results of measuring positional light sources 602 is a table for identifying the three-dimensional coordinates of the first positional light source 503 and the second positional light source 504 depending on the Roll and Tilt angles stored in the table of results of measuring positional light sources 601.

The three-dimensional coordinates of the first positional light source 503 and the second positional light source 504 are coordinates in the three-dimensional coordinate system having, as its origin, the camera origin 500 in FIG. 5. When a Roll rotation matrix is Rr, a Tilt rotation matrix is Rt, a horizontal movement from the camera origin 500 to the Tilt rotation center 507 is t, and the three-dimensional coordinates of a positional light source when seen from the camera origin in the case where the Roll rotation angle and the Tilt rotation angle form 0 degrees is $P_0$, the three-dimensional coordinates P of the positional light source is calculated according to the following equation (1).

[Math. 1]

$$P = Rr\{Rt(P_0 - t) + t\} \quad (1)$$

According to the above equation (1), the table of results of measuring positional light sources 602 is obtained. As a result, the three-dimensional coordinates of the first positional light source 503 and the second positional light source 504 are identified for each of the image coordinates stored in the table of results of measuring positional light sources 601.

Next, a description is given of a method of calculating the three-dimensional coordinates of a positional light source in image coordinates not included in the table of results of measuring positional light sources 601 for image coordinates in FIG. 6, with reference to the table of results of measuring positional light sources 601 using interior division interpolation such as linear interpolation. In other words, in the case where the ray information storage unit 102 stores ray information in which ray vectors are associated with particular pixels in input images, the ray vectors of pixels other than the particular pixels and the sub pixels in the respective input images are calculated using interpolation. The calculation method is described below.

For example, search is made for image coordinates present in the table of results of measuring positional light sources 601 from among the image coordinates surrounding the image coordinates to be interpolated. Next, interpolation coefficients are calculated based on positional relationships between the image coordinates to be interpolated and the searched-out image coordinates. Next, the three dimensional coordinates of the positional light sources corresponding to the interpolation target image coordinates are calculated by multiplying the three-dimensional coordinates of the positional light sources corresponding to the searched-out image coordinates by the interpolation coefficients.

Figure 7:
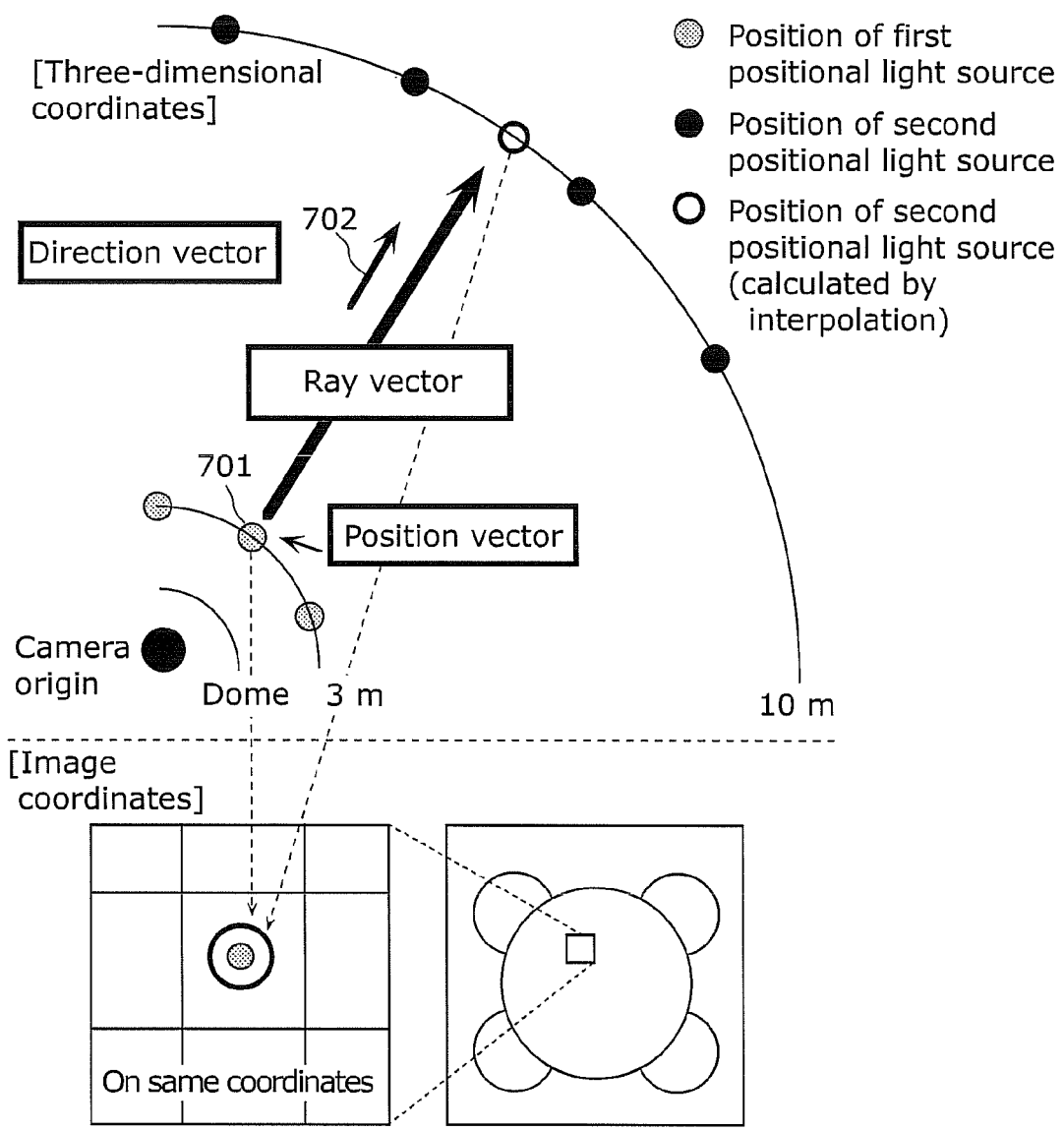
FIG. 7 is a diagram showing a relationship between a positional light source and a ray vector according to Embodiment 1 of the present invention.

FIG. 7 is a diagram showing a relationship between a positional light source and a ray vector according to Embodiment 1 of the present invention. As shown in FIG. 7, the ray vector corresponding to each of the image coordinates is defined by three-dimensional coordinates of the first positional light source 503 and the second positional light source 504.

More specifically, a position vector 701 is defined by the three-dimensional coordinates of the first positional light source 503. In addition, a direction vector 702 is defined by the direction on the three-dimensional coordinates from the first positional light source 503 to the second positional light source 504. Next, the ray vector is defined as a pair of the position vector 701 and the direction vector 702.

The ray vector that is obtained in this way for each of the pixels on a captured image is stored in the pixel unit table 401 in association with the pixel number of the pixel. The ray information storage unit 102 stores such a pixel unit tables 401 for each of the main mirror image and the sub mirror image.

As described above, the ray information storage unit 102 calculates ray vectors corresponding to at least two pixels in a plurality of input images, based on images including captured images of at least two kinds of light sources having mutually different distances from a reference point used in common in a plurality of optical systems corresponding to the plurality of input images (here, the main mirror image and the sub mirror image). Next, the ray information storage unit 102 stores ray information in which each of the calculated ray vectors is associated with a corresponding one of the at least two pixels.

Figure 8A:
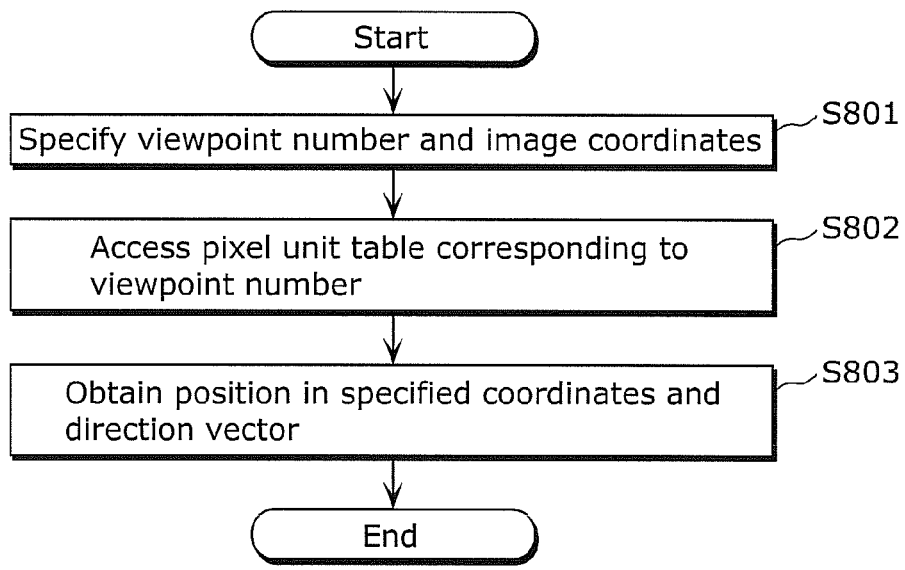
FIG. 8A is a flowchart of operations performed by a ray information storage unit according to Embodiment 1 of the present invention.
Figure 8B:
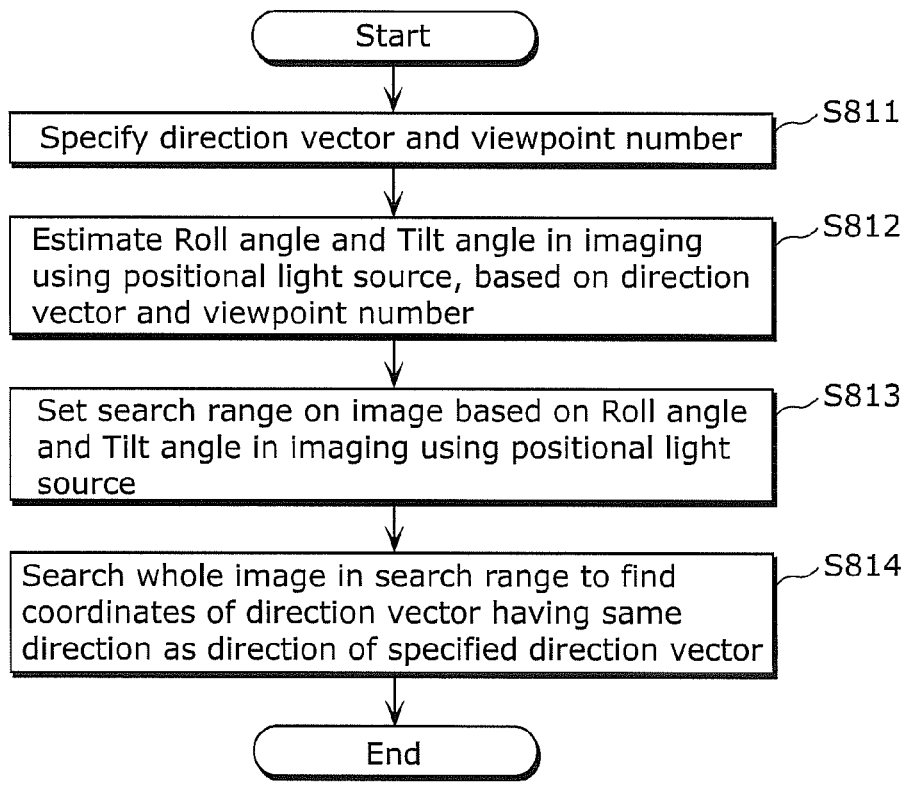
FIG. 8B is a flowchart of operations performed by a ray information storage unit according to Embodiment 1 of the present invention.

In addition, the ray information storage unit 102 stores the table of results of measuring positional light sources 601 and the table of results of measuring positional light sources 602 in FIG. 6. Furthermore, the ray information storage unit 102 has a function of mutually transforming the image coordinates and ray vectors (position vectors and direction vectors). With reference to FIGS. 8A and 8B, a brief description is given of operations performed by the ray information storage unit 102.

Each of FIG. 8A and FIG. 8B is a flowchart of operations performed by the ray information storage unit 102 according to Embodiment 1 of the present invention. More specifically, FIG. 8A shows a flow of transforming the image coordinates into ray vectors. In addition, FIG. 8B shows a flow of transforming the ray vectors into image coordinates.

In FIG. 8A, when transforming the image coordinates into ray vectors, the ray information storage unit 102 receives inputs of viewpoint numbers for differentiating images (the main mirror image 222 and the sub mirror image 223) captured from mutually different viewpoints and inputs of the image coordinates of the images corresponding to the viewpoint numbers (S801).

The ray information storage unit 102 accesses the pixel unit table 401 corresponding to the viewpoint numbers input in Step S801 (S802).

The ray information storage unit 102 transforms the image coordinates input in Step S801 into pixel numbers. Next, the ray information storage unit 102 obtains the ray vectors corresponding to the pixel numbers from the pixel unit table 401, and outputs the ray vectors (S803).

Here, the ray information storage unit 102 may receive inputs of the image coordinates in units of a sub pixel. In this case, when it is assumed that the ray vectors change smoothly between adjacent pixels, the ray information storage unit 102 may calculate the ray vectors corresponding to the sub pixels using general linear interpolation such as bi-linear interpolation.

On the other hand, in FIG. 8B, in the case of transforming the ray vectors into image coordinates, the ray information storage unit 102 first receives inputs of the direction vectors included in the ray vectors and inputs of the viewpoint numbers (S811).

The ray information storage unit 102 estimates approximate Roll and Tilt rotation angles which are conditions at the time when images of the positional light sources are captured to generate the ray information, based on the direction vectors and viewpoint numbers input in Step S811 (S812). For example, the ray information storage unit 102 is capable of easily estimating the approximate rotation angles by searching the three-dimensional coordinates of the first positional light source 503 and the second positional light source 504 corresponding to the direction vectors input in the table of results of measuring positional light sources in FIG. 6.

The ray information storage unit 102 sets a search area on each of the captured images corresponding to the viewpoint numbers input in Step S811, based on the Roll and Tilt rotation angles estimated in Step S812 (S813). For example, the ray information storage unit 102 can easily calculate the image coordinates from the Roil and Tilt rotation angles with reference to the table of results of measuring positional light sources 601 in FIG. 6, and thus can set, on the image, the search area having a sufficient size defined by the angles.

In addition, the ray information storage unit 102 enables simultaneous reference to the image coordinates of the different viewpoints based on the Roll and Tilt rotation angles. For this reason, the ray information storage unit 102 can set the search area on an image including a ray vector associated with a viewpoint number, based on a ray vector associated with another viewpoint number.

The ray information storage unit 102 searches, for each pixel, a direction vector having the same direction with the direction of the direction vector input in Step S811, from among ray vectors in the search area set in Step S813. Next, the ray information storage unit 102 outputs the image coordinates corresponding to the searched-out direction vector (S814).

For example, it is only necessary for the ray information storage unit 102 to determine whether or not the directions of the two vectors match each other based on the scalar products of the two vectors. More specifically, it is only necessary for the ray information storage unit 102 to determine that the directions of the two vectors match each other when the scalar product of the two vectors matches the product of the lengths of the vectors.

The ray information storage unit 102 searches the direction vector having the same direction of the direction of the input direction vector from among the direction vectors corresponding to the pixels included in the search area. However, the ray information storage unit 102 may search such a direction vector for each sub pixel. In this case, when it is assumed that the ray vectors change smoothly between adjacent pixels, the ray information storage unit 102 may calculate the ray vectors corresponding to the sub pixels using general linear interpolation such as bi-linear interpolation.

In addition, in order to accelerate the search, the ray information storage unit 102 may vertically and horizontally divide the search area into four rectangular areas, compare the direction vectors of ray vectors at the center positions of the respective rectangular areas, sets, as the next search area, the rectangular area including the direction vector closest to the input direction vector, and search the next direction vector. In this way, the ray information storage unit 102 may sequentially search direction vectors.

Next, operations performed by the epipolar plane calculating unit 101 are described with reference to FIG. 9.

Figure 9:
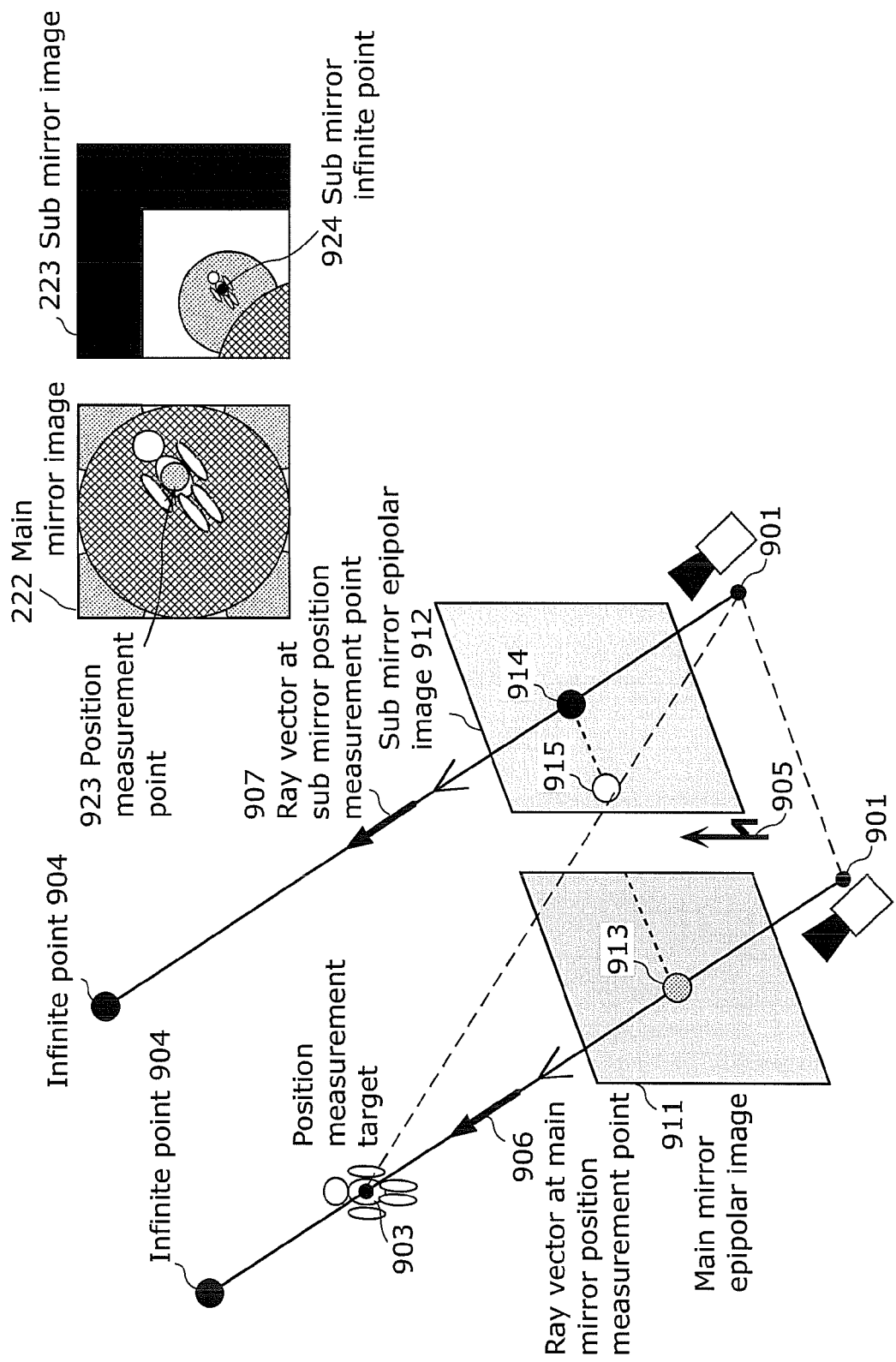
FIG. 9 is an illustration of operations performed by an epipolar plane calculating unit according to Embodiment 1 of the present invention.

FIG. 9 is an illustration of operations performed by the epipolar plane calculating unit 101 according to Embodiment 1 of the present invention. In FIG. 9, a viewpoint position 901 is the position of a virtual camera which captures an image of light reflected from a main mirror. Likewise, the viewpoint position 902 is the position of a virtual camera which captures an image of light reflected from a sub mirror. In addition, a position measurement target 903 is an object whose three-dimensional position is to be measured. In addition, an infinite point 904 is a point on a straight line which passes through the viewpoint position 901 and the position measurement target 903 and is distant from the viewpoint position 901 in the infinite direction. In addition, the normal vector 905 shows a normal on an epipolar plane. In addition, the ray vector 906 is a ray vector corresponding to the image coordinates of a position measurement point 923 in the main mirror image. In addition, the ray vector 907 is a ray vector corresponding to the image coordinates of a sub mirror infinite point 924 in the sub mirror image.

The main mirror epipolar image 911 is an image captured by a virtual camera which captures light reflected from the main mirror. In addition, the sub mirror epipolar image 912 is an image captured by a virtual camera which captures light reflected from the sub mirror. In addition, the position measurement point 913 is a pixel including an image of the position measurement target 903 on the main mirror epipolar image 911. In addition, the sub mirror infinite point 914 is a pixel including an image of the infinite point 904 on the sub mirror epipolar image 912. In addition, the corresponding point 915 is a pixel including an image of the position measurement target 903 on the sub mirror epipolar image 912.

The position measurement point 923 is a pixel which is of the main mirror image 222 and includes an image of the position measurement target 903 on the three-dimensional coordinates. In addition, the sub mirror infinite point 924 is a pixel including an image of the sub mirror image 922 and the infinite point 904 included in the sub mirror image 922.

Here, the infinite point 904 is a point on a straight line which passes through the viewpoint position 901 and the position measurement target 903 and is distant, in the infinite direction, from the viewpoint position 901 of the virtual camera of the main mirror. Accordingly, light incident from the infinite point 904 to the viewpoint position 901 of the virtual camera of the main mirror is parallel to light incident from the infinite point 904 to the viewpoint position 902 of the virtual camera of the sub mirror. Accordingly, the plane defined by the position measurement target 903 on the three-dimensional coordinates, the viewpoint position 901 of the virtual camera of the main mirror, and the viewpoint position 902 of the virtual camera of the sub mirror is an epipolar plane.

Here, the position measurement point 913 on the main mirror epipolar image is the same point as the position measurement point 923 on the main mirror image, and the image coordinates are specified by the position measurement point specifying unit 121. With this, the epipolar plane calculating unit 101 can extract, from the ray information storage unit 102, the ray vector 906 corresponding to the position measurement point 913 on the main mirror epipolar image, according to Steps S801 to S803 in FIG. 8A. This ray vector 906 is a light incident from the viewpoint position 901 of the virtual camera of the main mirror and advancing to the infinite point 904 via the position measurement target 903.

On the other hand, the ray vector 907 passing through the sub mirror infinite point 914 on the sub mirror epipolar image 912 has the same direction vector as the ray vector 906 passing through the position measurement point 913 on the main mirror epipolar image 911. For this reason, the epipolar plane calculating unit 101 can extract, from the ray information storage unit 102, the ray vector 907 at the infinite point and the image coordinates of the sub mirror infinite point 924 on the sub mirror image 223, according to Steps S811 to S814 in FIG. 8B. The ray vector 907 of this sub mirror infinite point 924 shows a light incident from the viewpoint position 902 of the virtual camera of the sub mirror and passing through the sub mirror infinite point 914 on the sub mirror epipolar image 912.

In other words, the epipolar plane calculating unit 101 defines the epipolar plane by calculating the coordinates of the position measurement point 923 which is on the main mirror image 921 input from the position measurement point specifying unit 121, the ray vector 906 corresponding to the position measurement point 923, the ray vector 907 of the sub mirror infinite point 924 having the same direction vector as the ray vector 906 at the position measurement point 923, and the coordinates of the sub mirror infinite point 924.

Figure 10A:
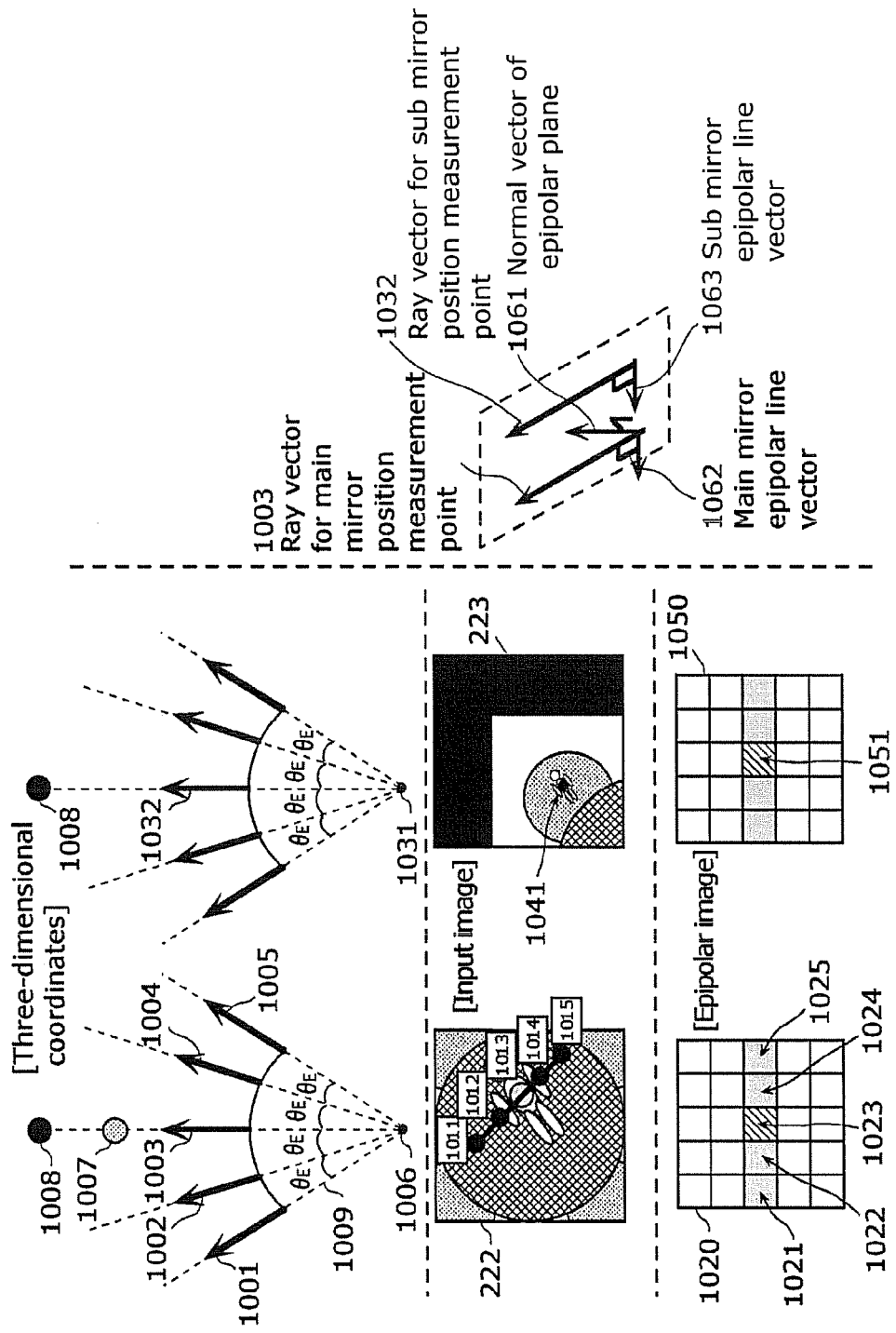
FIG. 10A is an illustration of operations performed by an epipolar image generating unit according to Embodiment 1 of the present invention.

Next, operations performed by the epipolar image generating unit 103 are described with reference to FIG. 10A. FIG. 10A is an illustration of operations performed by the epipolar image generating unit 103 according to Embodiment 1 of the present invention.

In FIG. 10A, ray vectors 1001 to 1005 are ray vectors of the main mirror. A viewpoint position 1006 is a viewpoint position of the virtual camera of the main mirror. A position measurement target 1007 is a position measurement point on a three-dimensional coordinates. An infinite point 1008 is a point distant in the infinite direction on a straight line from the viewpoint position 1006 of the virtual camera of the main mirror and passing through the position measurement target 1007. A unit angle 1009 is a unit angle θE. Here, the ray vector 1003 of the main mirror passes through the position measurement target 1007 on the three-dimensional coordinates, and corresponds to a first ray vector.

Points 1011 to 1015 on the main mirror image 222 are pixels of the main mirror image 222 respectively corresponding to ray vectors 1001 to 1005 of the main mirror.

The main mirror epipolar image 1020 is an image captured by the virtual camera from the viewpoint position 1006 of the main mirror, and corresponds to a first epipolar image. The pixels 1021 to 1025 on the main mirror epipolar image 1020 are the same pixels as the points 1011 to 1015 on the main mirror image 1010, and have the same luminance values.

Likewise, the ray vector 1032 is a ray vector of the sub mirror passing through the infinite point 1008, and corresponds to a second ray vector. The sub mirror infinite point 1041 is a point on the sub mirror image 1040 and corresponds to the sub mirror ray vector 1032 passing through the infinite point 1008. The sub mirror epipolar image 1050 is an image captured by the virtual camera from the viewpoint position 1031 of the sub mirror, and corresponds to a second epipolar image. The point 1051 is on the sub mirror epipolar image 1050, is the same pixel as the sub mirror infinite point 1041 on the sub mirror image 1040, and has the same luminance value.

The normal vector 1061 is a normal vector on the epipolar plane. The main mirror epipolar line vector 1062 is a vector indicating the main mirror epipolar line, and corresponds to a first epipolar line vector. The sub mirror epipolar line vector 1063 is a vector indicating the sub mirror epipolar line, and corresponds to a second epipolar line vector.

The epipolar image generating unit 103 receives, from the epipolar plane calculating unit 101, the ray vector 1003 for the position measurement point 1013, and the ray vector 1032 for the sub mirror infinite point 1041. Next, the epipolar image generating unit 103 calculates a vector vertical to the ray vector 1003 and the ray vector 1032, as a normal vector 1061 on the epipolar plane utilizing, for example, the cross product of the vectors.

Next, the epipolar image generating unit 103 calculates a vector vertical to the ray vector 1003 for the position measurement point 1013 and the normal vector 1061 on the epipolar plane, as a main mirror epipolar line vector 1062 utilizing, for example, the cross product of the vectors. Likewise, the epipolar image generating unit 103 calculates a vector vertical to the ray vector 1032 for the sub mirror infinite point 1041 and the normal vector 1061 on the epipolar plane, as a sub mirror epipolar line vector 1063 utilizing, for example, the cross product of the vectors.

The calculated main mirror epipolar line vector 1062 makes it possible to derive therefrom the ray vector corresponding to the pixel in the horizontal direction of the main mirror epipolar image 1020.

Next, the epipolar image generating unit 103 generates the ray vectors 1001 to 1005 of the main mirror by rotating, by a unit angle 1009, the ray vector 1003 in the direction of the main mirror epipolar line vector 1062. Next, the epipolar image generating unit 103 calculates the coordinates of the points 1011 to 1015 on a main mirror image 222 and corresponding to the pixels associated with the ray vectors, according to Steps S811 to S814 in FIG. 8B. Next, the epipolar image generating unit 103 sets the luminance of the points 1011 to 1015 to the pixels 1021 to 1025 corresponding to the main mirror epipolar image 1020.

Likewise, the calculated normal vector 1061 of the epipolar plane makes it possible to derive therefrom the ray vector corresponding to the pixel in the vertical direction of the main mirror epipolar image 1020. The epipolar image generating unit 103 is capable of generating a main mirror epipolar image according to a similar procedure. In addition, utilizing the same mechanism, the epipolar image generating unit 1003 can generate the sub mirror epipolar image 1050 by replacing the ray vector 1003 for the position measurement point with the ray vector 1032 for the sub mirror infinite point and replacing the main mirror epipolar line vector 1062 with the sub mirror epipolar line vector 1063.

At this time, the main mirror epipolar image 1020 and the sub mirror epipolar image 1050 are generated utilizing the shared normal vector 1061 on the epipolar plane, and thus the vertical directions on the epipolar image match each other. Likewise, the main mirror epipolar line vector 1062 and the sub mirror epipolar line vector 1063 are present on the same epipolar plane and have the same directions, and thus the horizontal directions on the epipolar image match each other. At this time, the horizontal pixel passing through the center of the epipolar image is a pixel on the epipolar line. Furthermore, the common unit angle 1009 is used, and thus equal-sized images of the position measurement target 1007 are formed on the epipolar images.

In other words, the epipolar image generating unit 103 receives, from the epipolar plane calculating unit 101, the ray vector 1003 for the position measurement point 1013, the ray vector 1032 for the sub mirror infinite point 1041. Next, the epipolar image generating unit 103 calculates the normal vector 1061 on the epipolar plane, the main mirror epipolar line vector 1062, and the sub mirror epipolar line vector 1063. The epipolar image generating unit 103 rotates, by the unit angle 1009, the direction of the ray vector 1003 for the position measurement point and the ray vector 1032 for the sub mirror infinite point in the normal direction of the epipolar plane and in the epipolar line direction, respectively. Next, using the ray information storage unit 102 in FIG. 1, the epipolar image generating unit 103 calculates the coordinates of the pixel of a corresponding one of the main mirror image 1010 and the sub mirror image 1040 which is for the rotated ray vector and sets the luminance value of the pixel at the coordinates to the luminance value of the pixel of the epipolar image, so as to generate an epipolar image.

Here, the unit angle 1009 may be arbitrarily determined, for example, such that a pixel of the main mirror epipolar image 1020 is defined as a pixel near the position measurement point in the main mirror image 1010. Here, a view field angle of the epipolar image is calculated by multiplying the unit angle 1009 by the number of pixels arranged in vertical and horizontal directions of the epipolar image. Thus, the unit angle 1009 may be calculated from an arbitrary view field angle and a resolution of the epipolar image.

Furthermore, the unit angle θE is calculated from the resolution of the vertical camera and the field view angle assuming that the ray vector 1003 for the position measurement point is a sight vector of the vertical camera and that the normal vector 1061 for the epipolar plane is an upper vector of the vertical camera. According to this calculation, it is possible to generate a distortion-corrected image in an arbitrary area when seen from the vertical camera, using the same mechanism as the epipolar image generating unit 103.

After the epipolar image is generated by the epipolar image generating unit 103, the corresponding point calculating unit 104 calculates the corresponding point on the sub mirror image and corresponding to the position measurement point on the main mirror image, using template matching or the like as in the case of using general stereo matching. In addition, in the calculation of the corresponding point, it is also possible to assign cross correlation coefficients or the like for the matching to reliability degrees of the position measurement points.

Next, the position measurement point calculating unit 105 extracts, from the ray information storage unit 102, the main mirror ray vector corresponding to the position measurement point on the main image and the sub mirror ray vector corresponding to the corresponding point on the sub image. Next, the position measurement point calculating unit 105 calculates a point at which the two ray vectors cross each other (or a point at which the two ray vectors are closest to each other). Lastly, the position measurement point calculating unit 105 transmits the three-dimensional coordinates of the point at which the two ray vectors cross, as the three-dimensional coordinates of the position measurement target, to the position measurement result display unit 122.

In addition, the position measurement point calculating unit 105 may output the distance of the two ray vectors when they are closest to each other as the reliability degrees of the three-dimensional coordinates of the position measurement target to the position measurement result display unit 122, together with the cross correlation coefficients for the matching executed by the corresponding point calculating unit 104.

The operations performed by the position measuring apparatus 100 are summarized below.

Figure 10B:
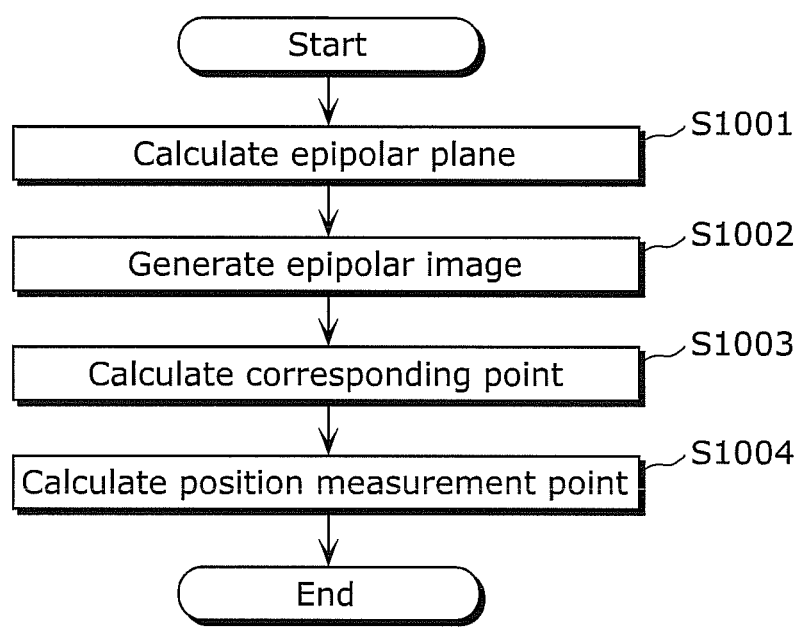
FIG. 10B is a flowchart of operations performed by a position measuring apparatus according to Embodiment 1 of the present invention.

FIG. 10B is a flowchart of operations performed by the position measuring apparatus 100 according to Embodiment 1 of the present invention. In other words, FIG. 10B indicates details of position measuring steps of measuring the three-dimensional positions of the position measurement target.

First, with reference to ray information, the epipolar plane calculating unit 101 obtains (i) a first ray vector corresponding to a position measurement point in a first input image 111 and (2) a second ray vector which is a ray vector having the same direction as the direction of the first ray vector and corresponds to a pixel in a second input image 112. Next, the epipolar plane calculating unit 101 calculates an epipolar plane using the first ray vector and the second ray vector (S1001).

Next, the epipolar image generating unit 103 generates a first epipolar image from the first input image 111, and a second epipolar image from the second input image 112 (S1002).

More specifically, the epipolar image generating unit 103 calculates a vector orthogonal to the first ray vector and the second ray vector, as a normal vector of the epipolar plane. In addition, the epipolar image generating unit 103 calculates a vector orthogonal to the first ray vector and the normal vector, as a first epipolar line vector. Next, the epipolar image generating unit 103 generates the first epipolar image from the first input image 111 using the normal vector and the first epipolar line vector.

In addition, the epipolar image generating unit 103 calculates a vector orthogonal to the second ray vector and the normal vector, as a second epipolar line vector. Next, the epipolar image generating unit 103 generates the second epipolar image from the second input image 112 using the normal vector and the second epipolar line vector.

More specifically, the epipolar image generating unit 103 rotates, by a predetermined unit angle, the direction of the first ray vector in the direction of the normal vector and in the direction of the first epipolar vector. The epipolar image generating unit 103 generates the first epipolar image using the luminance values of the pixels in the first input image and specifically in the directions obtained by rotating the directions of the first ray vectors in this way.

In addition, the epipolar image generating unit 103 rotates, by the unit angle, the direction of the second ray vector in the direction of the normal vector and in the direction of the second epipolar vector. The epipolar image generating unit 103 generates the second epipolar image using the luminance values of the pixels in the second input image and specifically in the directions obtained by rotating the directions of the second ray vectors in this way.

More specifically, the corresponding point calculating unit 104 calculates a corresponding point which is a pixel in the second epipolar image and corresponds to a pixel including an image of the position measurement target in the first epipolar image.

Next, the position measurement point calculating unit 105 obtains the ray vector associated with the position measurement point and the ray vector associated with the corresponding point, with reference to the ray information. Finally, the position measurement point calculating unit 105 calculates, as the three-dimensional position of the position measurement target, the three-dimensional position at which the obtained two ray vectors cross each other (S1004).

Although the position measuring apparatus 100 according to Embodiment 1 of the present invention has been described up to this point, the present invention is not limited to this embodiment.

For example, although the main mirror 202 and the sub mirror 203 are paraboloidal mirrors in the above description given with reference to FIG. 2, the main mirror 202 and the sub mirror 203 may be hyperbolic mirrors, curved surface mirrors, or more specifically, may be mirrors having shapes that allow sequential reflection of a surrounding light having a wide range. Here, the term of "sequential" is used to define a case where only one pixel has the same direction as the direction of a corresponding ray vector on an image in the same viewpoint (there is no other pixel having the same direction).

In addition, although the imaging apparatus in this embodiment includes a camera and a plurality of mirrors, another imaging apparatus is possible which includes two or more cameras including a wide-angle lens or a fisheye lens capable of capturing images of a surrounding light having a wide range. At this time, it is only necessary that a common camera origin is used, and more specifically that the camera origin 500 in FIG. 5 is set at a center point of two fisheye cameras or on the optical axis of one of the cameras. Likewise, it is possible to perform position measurement according to the same scheme as in the stereo camera including a general lens instead of such a fisheye lens. In other words, the position measuring apparatus 100 can measure the three-dimensional position of the position measurement target using the same mechanism irrespective of the structures of lenses or cameras as long as two or more images from mutually different viewpoints are available.

In addition, although the Roll rotating base and the Tilt rotating base are used when ray information is generated, these bases are not always necessary. For example, it is also good to prepare two kinds of hemispherical domes having mutually different radiuses, set them such that the centers of the domes match the camera origin, and project the luminance points on the hemispherical domes using a projector or the like, so as to generate ray information. Alternatively, it is also good to embed LEDs or the like as positional light sources in the hemispherical domes to generate such ray information. At this time, in order to increase the precision in the position measurement, it is preferable that the three-dimensional coordinates from the camera origin (=the center point between the domes) be calculated with respect to the positional light sources with a high precision.

In addition, although the epipolar image generating unit 103 generates an epipolar image by rotating the ray vectors by an equal angle such as the unit angle θE in FIG. 10A, such an epipolar image is not necessarily generated in this way. For example, the epipolar image generating unit 103 may rotate the ray vector such that the ray vector passes through the plane on the three-dimensional coordinates (for example, the plane vertical to the optical axis of the virtual camera), at equal intervals instead of by the equal angle.

More specifically, the epipolar image generating unit 103 may rotate the direction of the first ray vector in the direction of the normal vector and in the direction of the first epipolar line vector, at an angle that enables equal-interval shifts of the intersections of the first ray vector and the plane orthogonal to the first ray vector. In this case, the epipolar image generating unit 103 may rotate the direction of the second ray vector in the direction of the normal vector and in the direction of the second epipolar line vector, at the same angle as the angle at the time when the first epipolar image is generated.

In this way, when the epipolar images are generated using the common rotation scheme between mutually different viewpoints, the position measurement target in the respective epipolar images have the same size. Thus, the corresponding point calculating unit 104 can calculate the corresponding point. In addition, the epipolar image generating unit 103 may shift the ray vector in each epipolar image also by a common amount not only by such rotation.

In addition, the vertical and horizontal widths of the epipolar images may be arbitrarily adjusted. The vertical width of each epipolar image depends on the precision of the ray information and the scheme used by the corresponding point calculating unit 104. In addition, the horizontal width of each epipolar image depends on the smallest distance of the position measurement target from the camera origin.

For example, when the position measurement target is in the infinite direction, the corresponding point is positioned at the center pixel of the epipolar image. As the position measurement target approaches the camera origin, the corresponding position becomes distant from the center pixel on the horizontal pixel passing through the center of the epipolar image.

In addition, although the corresponding point calculating unit 104 calculates the corresponding point by template matching, it is also good to calculate a corresponding point using an optical flow, phase only correlation, or the like. Here, the corresponding point calculating unit 104 may handle gray-scale images or color images as the epipolar images in order to calculate the corresponding point. Alternatively, the corresponding point calculating unit 104 may calculate a corresponding point after transforming each epipolar image into an edge image using image processing.

Figure 4:
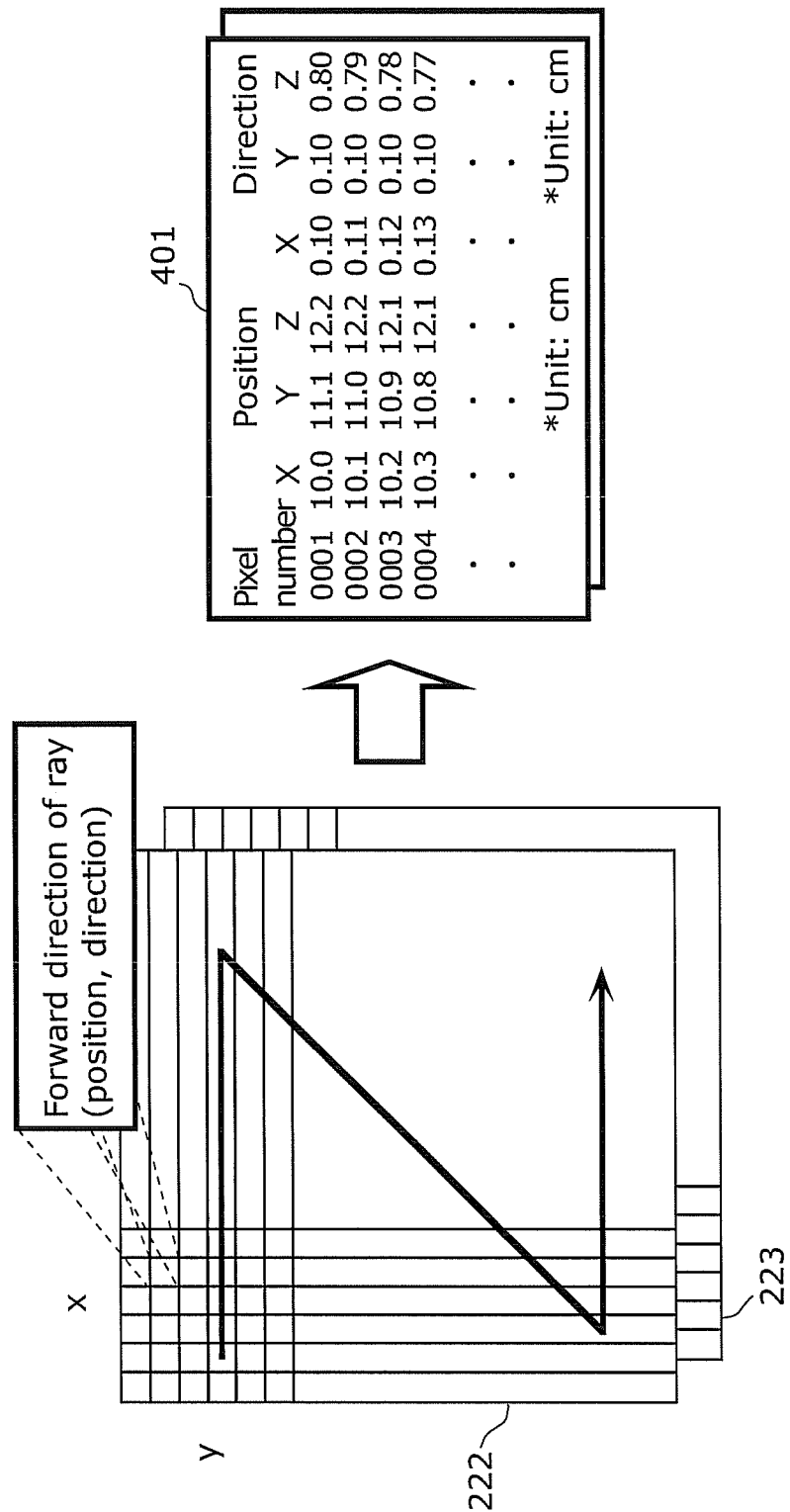
FIG. 4 is a diagram showing an example of a pixel unit table according to Embodiment 1 of the present invention.

In addition, although ray information such as the unit pixel table 401 in FIG. 4 is generated for each pixel, ray information does not always need to be generated for each pixel. For example, in order to reduce a required memory capacity, ray information may be generated in units of two pixels, four pixels, or the like. In this case, it is only necessary to calculate the ray vectors for the intermediate pixels using linear interpolation or the like assuming that the ray vectors change smoothly between several consecutive pixels.

(Embodiment 2)

Next, Embodiment 2 of the present invention is described.

Figure 11:
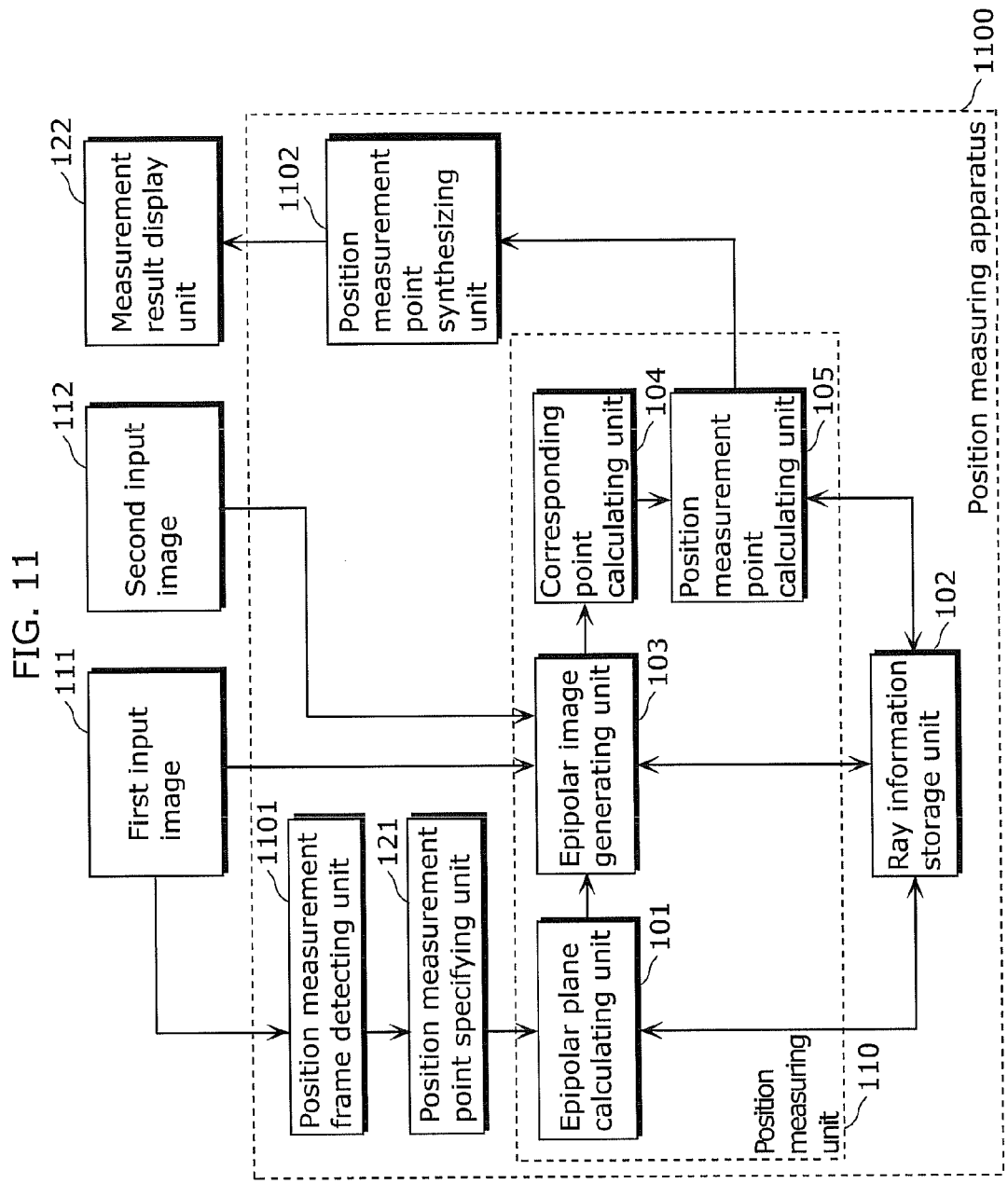
FIG. 11 is a block diagram showing a structure of a position measuring apparatus according to Embodiment 2 of the present invention.

FIG. 11 is a block diagram showing a structure of a position measuring apparatus 1100 according to Embodiment 2 of the present invention. In FIG. 11, the same structural elements as in FIG. 1 are assigned with the same numerical references, and the same descriptions thereof are not repeated here. The position measuring apparatus 1100 includes a position measurement frame detecting unit 1101, and a position measurement point synthesizing unit 1102.

When a first input image 111 (or a second input image 112) is input, the position measurement frame detecting unit 1101 corrects distortion of an omnidirectional image by panoramic extension or the like. Subsequently, with reference to a learning database, the position measurement frame detecting unit 1101 detects, using an image recognition technique, an image area including at least one of a person, a face, or a particular object in the first input image 111, and automatically detects a position measurement frame that encloses the detected image area.

Here, the learning database is a database storing learned data of the amounts of feature extracted from at least one image of the person, the face, and the particular object.

Lastly, the position measurement frame detecting unit 1101 divides the area in the position measurement frame vertically and horizontally, and transmits the apexes of the area segments to the position measurement point specifying unit 121. In other words, the position measurement frame detecting unit 1101 outputs, as position measurement points, a plurality of pixels included in the position measurement frame.

Figure 12:
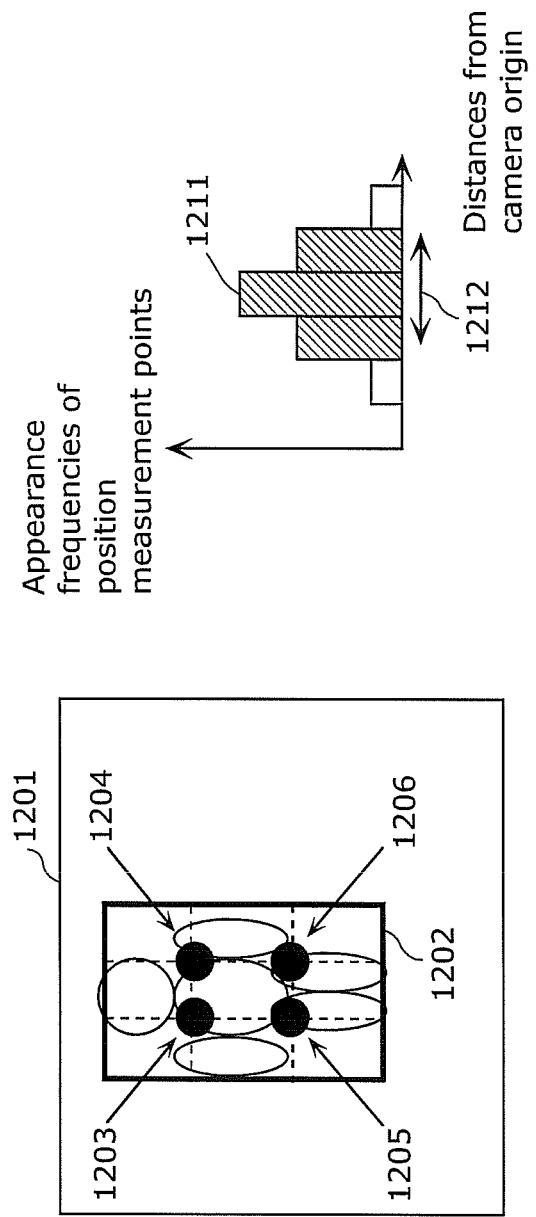
FIG. 12 is a diagram showing examples of position measurement points on a first input image according to Embodiment 2 of the present invention.

FIG. 12 is a diagram showing an example of position measurement points on the first input image 111. Upon detecting a person frame 1202 (position measurement frame) in an image 1201 obtained from the first input image 111 by panoramic extension, the position measurement frame detecting unit 1101 divides the person frame 1202 vertically and horizontally. Next, the position measurement frame detecting unit 1101 transmits, as position measurement points, intersections 1203 to 1206 in the person frame 1202 in this order to the position measurement point specifying unit 121.

The position measurement point synthesizing unit 1102 receives, from the position measurement point calculating unit 105, the position measurement points output therefrom and corresponding to the intersections 1203 to 1206 in the person frame on the three-dimensional coordinates in FIG. 12. Next, the position measurement point synthesizing unit 1102 sorts the position measurement points by distances from a camera origin, and then transmits a median value 1211 of the position measurement points on the three-dimensional coordinates or the average value of a surrounding range 1212 around the median value to the position measurement result display unit 122 as the final position measurement result in the person frame.

As described above, the position measuring apparatus 1100 having the position measurement frame detecting unit 1101 and the position measurement point synthesizing unit 1102 can measure the position measurement targets regarding these position measurement targets as planes instead of points. In addition, the position measuring apparatus 1100 is capable of measuring positions with high precision by excluding position measurement points having a large position measurement error by performing statistical processing based on a plurality of position measurement points.

Although the position measuring apparatus according to Embodiment 2 of the present invention has been described up to this point, the present invention is not limited to this embodiment.

For example, the position measurement frame detecting unit 1101 may detect edges in the person frame 1202, and may transmit pixels including a strong edge to the position measurement point specifying unit 121 as position measurement points. Utilizing the pixels including the strong edge as the position measurement points increases the precision in the calculation of the corresponding points.

In addition, based on previously provided knowledge about the person frame, the position measurement frame detecting unit 1101 may calculate an image area which is around the breast of the person in the person frame and thus has little mixture of the background, and may select pixels included in the area around the breast as the position measurement points. The position measurement frame detecting unit 1101 is capable of, for example, calculating the area around the breast, from an average image in the learned data which is about the person and thus is used for the detection of the person frame.

In addition, the position measurement frame detecting unit 1101 may extract the position measurement frame using arbitrary image processing instead of the image recognition. For example, assuming that an image area which is determined to be different from the background based on a background difference includes a person, a vehicle, or a suspected object that is a monitoring target, the position measurement frame detecting unit 1101 may automatically detect the image area as a position measurement frame. Likewise, the position measurement frame detecting unit 1101 may detect, as such a position measurement frame, an image area having a large motion between frames, based on an inter-frame difference.

In addition, although the position measurement point synthesizing unit 1102 sorts the plurality of position measurement points by the distances from the camera origin and outputs the final position measurement points by the statistical processing, the position measurement point synthesizing unit 1102 may use another scheme. For example, the position measurement point synthesizing unit 1102 may output, as the final position measurement point, the average of the plurality of position measurement points assigned with reliability-degree weights on the three-dimensional positions. Each of the reliability degrees of the respective position measurement points are calculated based on at least (i) a cross correlation coefficient calculated by the corresponding point calculating unit 104 and (ii) the closest distance between two ray vectors calculated by the position measurement point calculating unit 105. Alternatively, the reliability degrees of the respective position measurement points may be calculated based on reliability degrees of a position measurement frame detected by the position measurement frame detecting unit 1101 (examples of the reliability degrees include reliability degrees of frame segments in the person frame and the reliability degree of the pixel including an image of the center of the breast.)

(Embodiment 3)

Unlike Embodiments 1 and 2 each showing an example of position measurement, Embodiment 3 shows an example of an image processing apparatus which generates an image (that is, a distortion-corrected image) of the orthogonal coordinate system which is closer to an image that is actually viewed by human beings, by utilizing ray information of an image of the polar coordinate system captured using an omnidirectional camera or the like. Such a distortion-corrected image is mainly used by a monitoring camera or the like, and is conventionally generated using parameters stored inside a camera. However, in this embodiment, such a distortion-corrected image is generated by utilizing the ray information as in Embodiments 1 and 2. In this way, even when an acrylic hemispherical dome for dust and water prevention is attached to a small omnidirectional camera, it is possible to perform highly accurate distortion correction without using such parameters stored inside a camera nor performing complex optical calculation.

Figure 13:
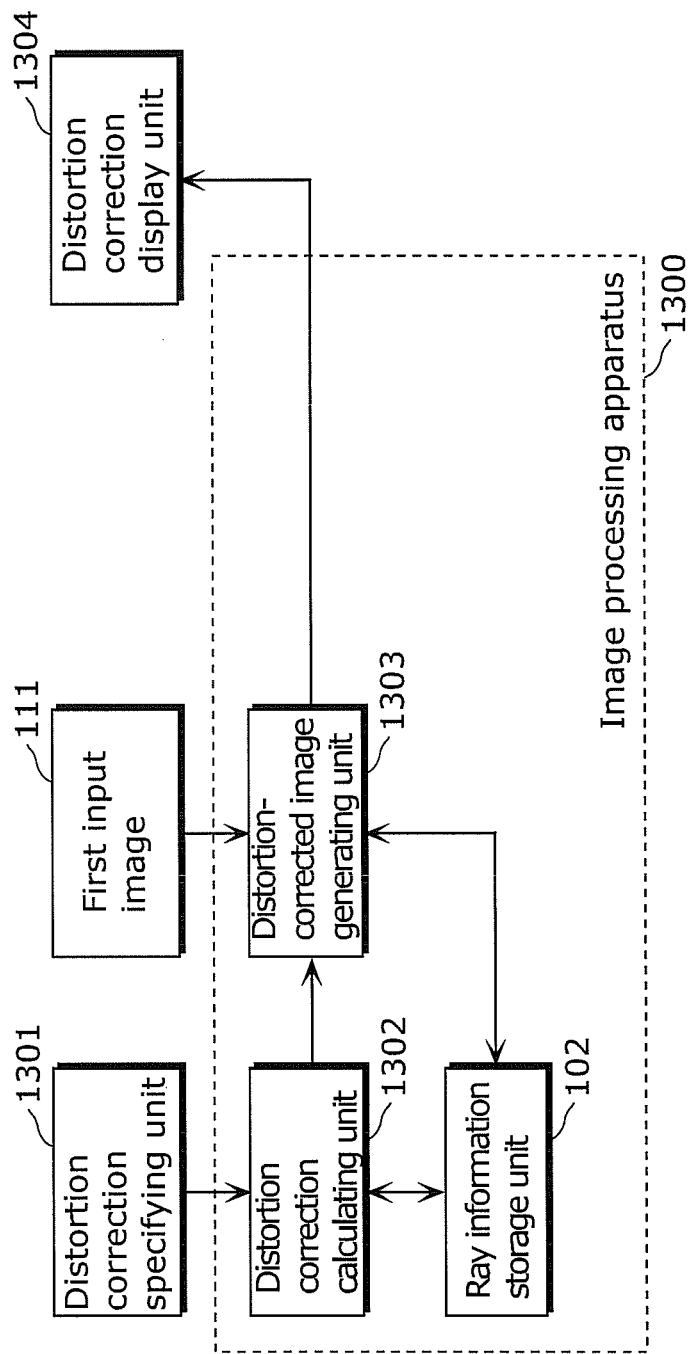
FIG. 13 is a block diagram showing a structure of an image processing apparatus according to Embodiment 3 of the present invention.

FIG. 13 is a block diagram showing a structure of an image processing apparatus 1300 according to Embodiment 3 of the present invention. In FIG. 13, the same structural elements as in FIG. 1 are assigned with the same numerical references, and the same descriptions thereof are not repeated here. The image processing apparatus 1300 performs such distortion correction. The image processing apparatus 1300 includes a distortion correction calculating unit 1302, a distortion-corrected image generating unit 1303, and ray information storage unit 102. In addition, the image processing apparatus 1300 receives inputs from the distortion correction specifying unit 1301, and outputs the processing result to the distortion correction display unit 1304.

The distortion correction specifying unit 1301 specifies a center position of the distortion-corrected image, horizontal and vertical image angles, and horizontal and vertical resolutions. At this time, one of the pixels which is in the first input image 111 and is a target for the distortion correction is specified as the center position of the distortion-corrected image. Here, in general, the horizontal and vertical image angles indicate zoom levels. More specifically, a large image angle increases the distortion-corrected range of an image and a small image angle decreases the distortion-corrected range of the image. Thus, appropriate horizontal and vertical image angles are specified depending on applications.

The distortion correction calculating unit 1302 calculates vectors necessary to represent the distortion-corrected image as an image having (i) a vertical side corresponding to a vertical vector from the floor surface and (ii) a horizontal side corresponding to a vector which is orthogonal to a vertical line from the floor surface and a ray vector at the center of the distortion-corrected image. First, the distortion correction calculating unit 1302 obtains, from the ray information storage unit 102, the optical vector at the center of the distortion-corrected image specified by the distortion correction specifying unit 1301. Next, the distortion correction calculating unit 1302 calculates a vector which is orthogonal to the predetermined vertical vector from the floor surface and the ray vector at the center of the distortion-corrected image.

The distortion-corrected image generating unit 1303 generates the distortion-corrected image based on (i) the ray vector at the center of the distortion-corrected image, (ii) the predetermined vertical vector from the floor surface, (iii) the vector orthogonal to the two vectors, (iv) the horizontal and vertical resolutions, and (v) the horizontal and vertical image angles, all of which are outputs from the distortion correction calculating unit 1302.

Figure 14:
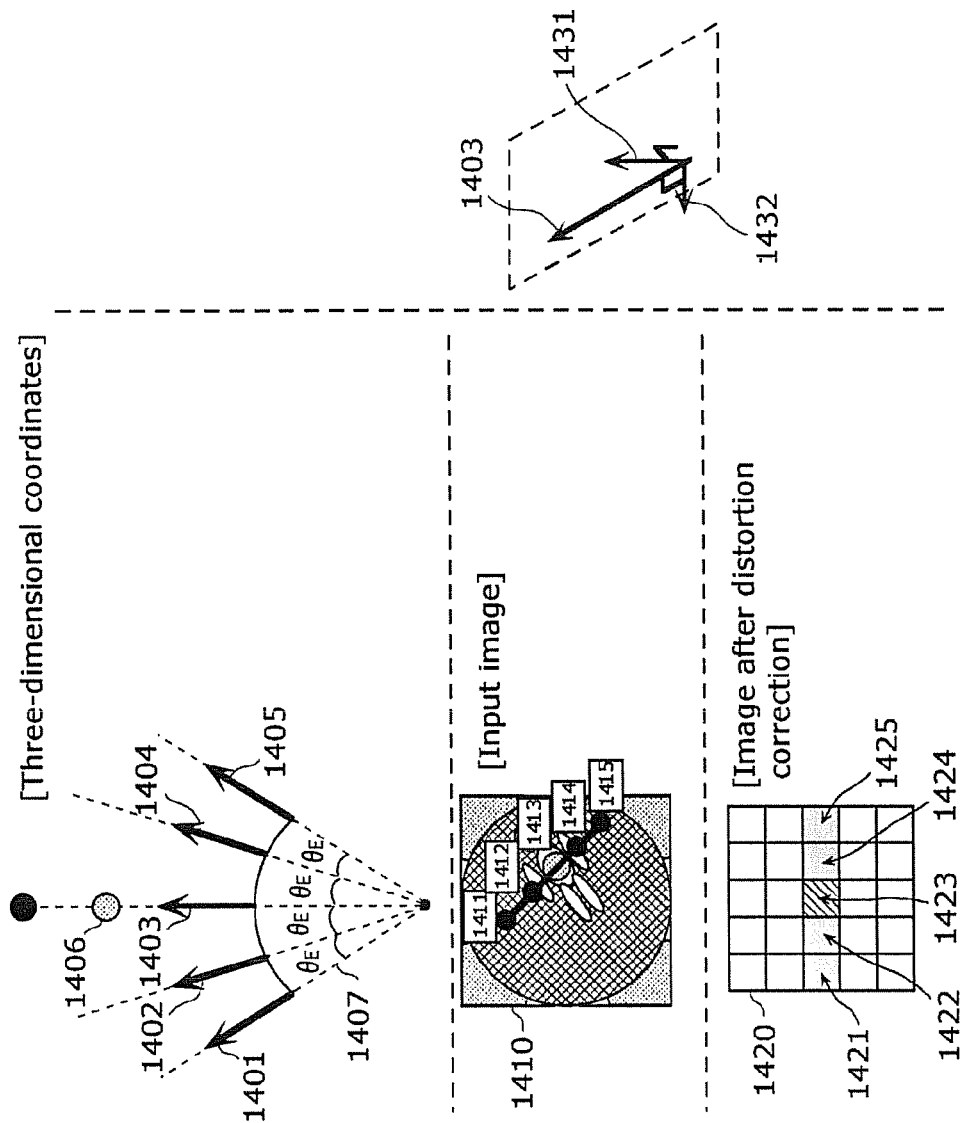
FIG. 14 is an illustration of operations performed by a distortion-corrected image generating unit according to Embodiment 3 of the present invention.

Next, operations performed by the distortion-corrected image generating unit 1303 are described with reference to FIG. 14. FIG. 14 is an illustration of operations performed by the distortion-corrected image generating unit 1303 according to Embodiment 3 of the present invention.

In FIG. 14, ray vectors 1401 to 1405 are ray vectors. A point 1406 is an image point corresponding to the center of a distortion-corrected image on the three-dimensional space. A unit angle 1407 is a unit angle θE. In addition, a ray vector 1403 is a ray vector which passes through the center point of the distortion-corrected image.

An input image 1410 is an image which is a target for distortion correction, and corresponds to the first input image 111. Pixels 1411 to 1415 are pixels corresponding to the ray vectors 1401 to 1405, and of the input image 1410.

An image 1420 is the distortion-corrected image. The pixels 1421 to 1425 are pixels to which the luminance values of the corresponding pixels 1411 to 1415 of the input image 1410 are set.

In addition, a vertical vector 1431 is a vector vertical to the floor surface. A vector 1432 is a vector which is orthogonal to the ray vector 1403 corresponding to the center point of the distortion-corrected image and the vertical vector 1431. Each of the vertical vector 1431 and the vector 1432 is output from the distortion correction calculating unit 1302.

The unit angle 1407 in the horizontal direction is calculated by dividing the image angle in the horizontal direction by the resolution in the horizontal direction. In addition, the horizontal direction is calculated utilizing the vector 1432 orthogonal to (i) the ray vector 1403 which is output from the distortion correction calculating unit 1302 as passing through the center point of the distortion-corrected image and (ii) the vertical vector 1431 from the floor surface.

In this way, the calculation yields the ray vectors 1401 to 1405. In this way, the distortion-corrected image generating unit 1303 searches the pixels respectively corresponding to the ray vectors 1401 to 1405 as having the same-direction ray vectors, with reference to the data stored in the ray information storage unit 102. Accordingly, the distortion-corrected image generating unit 1303 can calculate luminance values of the respective pixels 1411 to 1415 which are of the input image 1410 and correspond to the ray vectors 1401 to 1405, respectively. Subsequently, the distortion-corrected image generating unit 1303 sets the luminance values of the corresponding pixels 1411 to 1415 to the pixels 1421 to 1425 of the distortion-corrected image 1420 to generate the distortion-corrected image. The distortion-corrected image generating unit 1303 sets luminance values to the pixels in the vertical direction in the same manner by using a predetermined vertical vector 1431 from the floor surface.

According to the above-described procedure, the image processing apparatus 1300 is capable of generating a distortion-corrected image utilizing ray information.

The position measuring apparatus and the image processing apparatus according to an aspect of the present invention have been described based on the above embodiments. However, the present invention is not limited to these embodiments. Those skilled in the art will readily appreciate that many modifications are possible in the exemplary embodiments and other embodiments are possible by arbitrarily combining the structural elements of the embodiments without materially departing from the novel teachings and advantageous effects of the present invention. Accordingly; all of such modifications and other embodiments are intended to be included within the scope of the present invention.

For example, some or all of the structural elements of the position measuring apparatus or the image processing apparatus according to any one of Embodiments 1 to 3 may be configured as a signal system Large Scale Integration (LSI).

A system LSI is a super multifunctional LSI manufactured by integrating a plurality of structural units on a single chip, and more specifically is a computer system configured to include a Read Only Memory (ROM), a Random Access Memory (RAM), or the like. A ROM includes a computer program stored therein. The system LSI achieves its functions through a microprocessor's operations according to the computer program.

The name used here is a system LSI, but it may also be referred to as an IC, a system LSI, a super LSI, or an ultra LSI, depending on the degree of integration. Moreover, ways to achieve such integration are not limited to the LSI, and special circuit or general purpose processor and so forth can also achieve the integration. A Field Programmable Gate Array (FPGA) that can be programmed after manufacturing LSI or a reconfigurable processor that allows re-configuration of the connection or configuration of LSI can be used for the same purpose.

Furthermore, when a circuit integration technology for replacing LSIs with new circuits appears in the future with advancement in semiconductor technology and derivative other technologies, the circuit integration technology may be naturally used to integrate functional blocks. Application of biotechnology is one such possibility.

Furthermore, the present invention can be implemented not only as a position measuring apparatus or an image processing apparatus including the above described unique processing units, but also can be realized as a position measuring method or an image processing method including the steps corresponding to the unique processing units of the position measuring apparatus or the image processing apparatus. Furthermore, the present invention can be realized as a computer program causing a computer to execute the respective unique steps of the position measuring method or the image processing method. As a matter of course, such a computer program can be distributed via computer-readable recording media such as CD-ROMs or communication networks such as the Internet.

INDUSTRIAL APPLICABILITY

A position measuring apparatus according to the present invention has a function of measuring positions in all directions, and is applicable as an omnidirectional sensor etc. in a monitoring system for a wide range in which a person, a vehicle, a package and/or the like are/is monitored and in a mobile robot which recognizes a walking person, a car and/or the like. Furthermore, the position measuring apparatus is also applicable for use as an omnidirectional sensor which is provided above a large display or on a ceiling to recognize the position or the posture of a person in a wide range and to operate a content within the large display.

What is claimed is:

1. A position measuring apparatus which measures a three-dimensional position of a position measurement target, based on a first input image and a second input image included in a plurality of input images captured from mutually different viewpoints, the position measuring apparatus comprising:
a ray information storage unit configured to store ray information in which each of ray vectors is associated with a corresponding one of pixels in one of the first input image and the second input image included in the plurality of input images, each of the ray vectors indicating a forward direction of a light incident onto an optical system for the one of the first input image and the second input image; and
a position measuring unit configured to measure the three-dimensional position of the position measurement target by calculating the three-dimensional position at which a ray vector corresponding to a measurement target in the first input image and a ray vector corresponding to a measurement target in the second input image cross each other, using the ray information stored in the ray information storage unit,
wherein the ray information storage unit is configured to calculate at least two of the ray vectors each of which is associated with a corresponding one of at least two of the pixels included in the plurality of input images, based on images each of which including image areas and each image area including a corresponding one of at least two kinds of light sources arranged to have mutually different distances from a reference point that is commonly used for a plurality of optical systems respectively corresponding to the plurality of input images, and store the ray information in which each of the calculated at least two ray vectors is associated with the corresponding one of the at least two of the pixels.

2. The position measuring apparatus according to claim 1, wherein the position measuring unit includes:
an epipolar plane calculating unit configured to calculate, using the ray information, an epipolar plane that is defined by (i) a position of a first optical system corresponding to the first input image included in the plurality of input images, (ii) a position of a second optical system corresponding to the second input image included in the plurality of input images, and (iii) a position of the position measurement target;
an epipolar image generating unit configured to generate a first epipolar image corresponding to the first input image and a second epipolar image corresponding to the second input image, based on a normal vector on the epipolar plane and each of an epipolar line vector in the first input image and an epipolar line vector in the second input image;
a corresponding point calculating unit configured to calculate a corresponding point which is a pixel in the second epipolar image and corresponds to a position measurement point which is a pixel in the first epipolar image and in which an image of the position measurement target is included; and
a position measurement point calculating unit configured to obtain, with reference to the ray information, a ray vector associated with the position measurement point and a ray vector associated with the corresponding point, and calculate, as the three-dimensional position of the position measurement target, a three-dimensional position at which the obtained two ray vectors cross each other.

3. The position measuring apparatus according to claim 2, wherein the epipolar plane calculating unit is configured to:
obtain, with reference to the ray information, (i) a first ray vector associated with the position measurement point in the first input image, and (ii) a second ray vector having the same direction as a direction of the first ray vector and associated with a pixel in the second input image; and
calculate the epipolar plane using the first ray vector and the second ray vector.

4. The position measuring apparatus according to claim 3, wherein the epipolar image generating unit is configured to:
calculate, as a normal vector of the epipolar plane, a vector which is orthogonal to the first ray vector and the second ray vector;
calculate, as a first epipolar line vector, a vector which is orthogonal to the first ray vector and the normal vector;
generate the first epipolar image from the first input image, using the normal vector and the first epipolar line vector;
calculate, as a second epipolar line vector, a vector which is orthogonal to the second ray vector and the normal vector; and
generate the second epipolar image from the second input image, using the normal vector and the second epipolar line vector.

5. The position measuring apparatus according to claim 4, wherein the epipolar image generating unit is configured to:
generate the first epipolar image using luminance values of the pixels in each of directions of the first input image, the directions being obtainable by rotating, by a predetermined unit angle, a direction of the first ray vector in a direction of the normal vector and in a direction of the first epipolar line vector; and
generate the second epipolar image using luminance values of the pixels in each of directions of the second input image, the directions being obtainable by rotating, by the predetermined unit angle, a direction of the second ray vector in a direction of the normal vector and in a direction of the second epipolar line vector.

6. The position measuring apparatus according to claim 4, wherein the epipolar image generating unit is configured to:
generate the first epipolar image using luminance values of the pixels in each of directions of the first input image, the directions being obtainable by rotating, by an angle, a direction of the first ray vector in a direction of the normal vector and in a direction of the first epipolar line vector, and the angle enabling the first ray vector to move in the direction while forming equal-interval intersections with a plane orthogonal to the first ray vector; and
generate the second epipolar image using luminance values of the pixels in each of directions of the second input image, the directions being obtainable by rotating, by the angle, a direction of the second ray vector in a direction of the normal vector and in a direction of the second epipolar line vector, and the angle being equal to the angle used to generate the first epipolar image.

7. The position measuring apparatus according to claim 1, wherein the plurality of input images are obtained from images captured by an imaging apparatus including a plurality of mirrors each having a shape that enables reflection of a surrounding light having a wide range and at least one camera which captures light reflected from the plurality of mirrors.

8. The position measuring apparatus according to claim 1, wherein the plurality of input images are obtained from images captured by an imaging apparatus including at least two pairs of a camera and either a wide-angle lens or a fisheye lens each capable of imaging a surrounding light having a wide range.

9. The position measuring apparatus according to claim 1, wherein the ray information storage unit is configured to store the ray information in which particular pixels respectively included in the plurality of input images are associated with respectively corresponding ones of the ray vectors, and calculate ray vectors associated with pixels other than the particular pixels in the plurality of input images and ray vectors associated with sub pixels in the plurality of input images.

10. The position measuring apparatus according to claim 1, further comprising,
a position measurement frame detecting unit configured to detect, from at least one of the plurality of input images, a position measurement frame that is a frame including an image area in which the position measurement target is included, and output, as position measurement points, a plurality of pixels within the position measurement frame,
wherein the position measuring unit is configured to measure a three-dimensional position of each of the position measurement points output from the position measurement frame detecting unit, and
the position measuring apparatus further comprises
a position measurement point synthesizing unit configured to synthesize the three-dimensional positions of the position measurement points measured by the position measuring unit, and output, as a result of the measurement, a synthesized three-dimensional position.

11. The position measuring apparatus according to claim 10,
wherein the position measurement frame detecting unit is configured to detect, using an image recognition technique, at least one image area including at least one of a person, a face, a particular object from among the at least one input image, with reference to a learned database of learned feature amounts extracted from the at least one input image of the person, the face, and the particular object, and detect, as the position measurement frame, a frame including the detected image area.

12. The position measuring apparatus according to claim 10,
wherein the position measurement point synthesizing unit is configured to output, as the result of the measurement, one of a median value or an average value of the three-dimensional positions of the position measurement points.

13. The position measuring apparatus according to claim 10,
wherein the corresponding point calculating unit is configured to calculate a reliability degree of each of the position measurement points, using a correlation coefficient between the position measurement point and a corresponding one of the corresponding points,
the position measurement point calculating unit is configured to calculate the reliability degree of each of the position measurement points, using a smallest distance among distances between ray vectors associated with the position measurement points and ray vectors associated with the corresponding points, and
the position measurement point synthesizing unit is configured to add weights of the reliability degrees of the position measurement points to the three-dimensional positions of the plurality of position measurement points and synthesize the position measurement points having the weights.

14. The position measuring apparatus according to claim 13,
wherein the position measurement frame detecting unit is configured to calculate the reliability degree of each of the position measurement points, using a correlation value with a data item in a learning database used in the image recognition technique.

15. The position measuring apparatus according to claim 1, wherein the position measuring apparatus is configured as an integrated circuit.

16. A position measuring method of measuring a three-dimensional position of a position measurement target, based on a first input image and a second input image included in a plurality of input images captured from mutually different viewpoints, the position measuring method comprising:
- measuring the three-dimensional position of the position measurement target by calculating the three-dimensional position at which a ray vector corresponding to a measurement target in the first input image and a ray vector corresponding to a measurement target in the second input image cross each other using ray information in which each of ray vectors is associated with a corresponding one of pixels in one of the first input image and the second input image in the plurality of input images, each of the ray vectors indicating a forward direction of a light incident onto an optical system for the one of the first input image and the second input image, and
- calculating at least two of the ray vectors each of which is associated with a corresponding one of at least two of the pixels included in the plurality of input images, based on images each of which including image areas and each image area including a corresponding one of at least two kinds of light sources arranged to have mutually different distances from a reference point that is commonly used for a plurality of optical systems respectively corresponding to the plurality of input images, and storing the ray information in which each of the calculated at least two ray vectors is associated with the corresponding one of the at least two of the pixels.

17. A non-transitory computer-readable recording medium having a program recorded thereon, the program causing a computer to execute the position measuring method according to claim 16.

18. An image processing apparatus which corrects distortion in each of input images, the image processing apparatus comprising:
- a ray information storage unit configured to store ray information in which each of ray vectors is associated with a corresponding one of pixels in one of a first input image and a second input image included in the plurality of input images, each of the ray vectors indicating a forward direction of a light incident onto an optical system for the one of the first input image and the second input image; and
- a distortion-corrected image generating unit configured to correct distortion in each of the input images, using the ray information stored in the ray information storage unit,
- wherein the ray information stored in the ray information storage unit is used to measure a three-dimensional position of a position measurement target by calculating a three-dimensional position at which a ray vector corresponding to a measurement target in the first input image and a ray vector corresponding to a measurement target in the second input image cross each other, and
- the ray information storage unit is configured to calculate at least two of the ray vectors each of which is associated with a corresponding one of at least two of the pixels included in the plurality of input images, based on images each of which including image areas and each image area including a corresponding one of at least two kinds of light sources arranged to have mutually different distances from a reference point that is commonly used for a plurality of optical systems respectively corresponding to the plurality of input images, and store the ray information in which each of the calculated at least two ray vectors is associated with the corresponding one of the at least two of the pixels.

19. The image processing apparatus according to claim 18, wherein the image processing apparatus is configured as an integrated circuit.

20. An image processing method of correcting distortion in each of input images, the image processing method comprising:
- storing in a ray information storage unit ray information in which each of ray vectors is associated with a corresponding one of pixels in one of a first input image and a second input image included in the plurality of input images, each of the ray vectors indicating a forward direction of a light incident onto an optical system for the one of the first input image and the second input image; and
- correcting distortion in each of the input images using the ray information in which each of ray vectors is associated with a corresponding one of pixels in one of the first input image and the second input image, each of the ray vectors indicating a forward direction of a light incident onto an optical system for the one of the first input image and the second input image,
- wherein the ray information stored in the ray information storage unit is used to measure a three-dimensional position of a position measurement target by calculating a three-dimensional position at which a ray vector corresponding to a measurement target in the first input image and a ray vector corresponding to a measurement target in the second input image cross each other, and
- the storing step calculates at least two of the ray vectors each of which is associated with a corresponding one of at least two of the pixels included in the plurality of input images, based on images each of which including image areas and each image area including a corresponding one of at least two kinds of light sources arranged to have mutually different distances from a reference point that is commonly used for a plurality of optical systems respectively corresponding to the plurality of input images, and stores the ray information in which each of the calculated at least two ray vectors is associated with the corresponding one of the at least two of the pixels.

21. A non-transitory computer-readable recording medium having a program recorded thereon, the program causing a computer to execute the image processing method according to claim 20.

* * * * *